US008515835B2

(12) United States Patent
Wu et al.

(10) Patent No.: US 8,515,835 B2
(45) Date of Patent: Aug. 20, 2013

(54) SYSTEMS AND METHODS FOR MULTI-ECHELON INVENTORY PLANNING WITH LATERAL TRANSSHIPMENT

(75) Inventors: Xinmin Wu, Cary, NC (US); Jinxin Yi, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 24 days.

(21) Appl. No.: 12/871,487

(22) Filed: Aug. 30, 2010

(65) Prior Publication Data

US 2012/0054076 A1   Mar. 1, 2012

(51) Int. Cl.
*G06Q 10/00*   (2012.01)

(52) U.S. Cl.
USPC .................. 705/28; 705/7; 705/10; 705/330; 235/385; 706/925

(58) Field of Classification Search
USPC .............................. 705/28, 7, 8, 10; 235/385
See application file for complete search history.

(56) References Cited

U.S. PATENT DOCUMENTS

| | | | |
|---|---|---|---|
| 5,175,692 A | 12/1992 | Mazouz et al. | |
| 5,195,172 A | 3/1993 | Elad et al. | |
| 5,319,781 A | 6/1994 | Syswerda | |
| 5,627,973 A | 5/1997 | Armstrong et al. | |
| 5,652,842 A | 7/1997 | Siegrist, Jr. et al. | |
| 5,712,989 A | 1/1998 | Johnson et al. | |
| 5,767,854 A | 6/1998 | Anwar | |
| 5,799,286 A | 8/1998 | Morgan et al. | |
| 5,867,494 A | 2/1999 | Krishnaswamy et al. | |
| 5,926,820 A | 7/1999 | Agrawal et al. | |
| 5,946,662 A * | 8/1999 | Ettl et al. | 705/7.26 |
| 5,953,707 A | 9/1999 | Huang et al. | |
| 5,963,910 A | 10/1999 | Ulwick | |
| 5,999,908 A | 12/1999 | Abelow | |
| 6,009,407 A | 12/1999 | Garg | |
| 6,014,640 A | 1/2000 | Bent | |
| 6,023,684 A | 2/2000 | Pearson | |
| 6,029,139 A | 2/2000 | Cunnignham et al. | |
| 6,041,267 A | 3/2000 | Dangat et al. | |
| 6,076,071 A | 6/2000 | Freeny, Jr. | |
| 6,078,892 A | 6/2000 | Anderson et al. | |
| 6,115,691 A | 9/2000 | Ulwick | |

(Continued)

OTHER PUBLICATIONS

Armstrong, Mark, "Multiproduct Nonlinear Pricing", Econometrica, vol. 64, No. 1, pp. 51-75 (Jan. 1996).

(Continued)

*Primary Examiner* — Vanel Frenel
(74) *Attorney, Agent, or Firm* — Kilpatrick Townsend & Stockton LLP

(57) ABSTRACT

In accordance with the teachings described herein, systems and methods are provided for optimizing inventory in a multi-echelon inventory distribution network having at least a first echelon and a second echelon. An example method may include the steps of: receiving information identifying an inventory pool that includes at least two inventory locations within the first or second echelons; determining inventory excesses or shortages at inventory locations within the inventory pool; determining an inventory transshipment plan for transferring inventory between two or more of the inventory locations in the inventory pool based at least in part on the inventory excesses or shortages; and determining an inventory replenishment plan for replenishing inventory at one or more inventory locations in the first echelon from one or more primary supply locations in the second echelon, the inventory replenishment plan being based at least in part on the inventory excesses or shortages and accounting for any inventory transfers identified in the inventory transshipment plan.

15 Claims, 16 Drawing Sheets

(56) References Cited

U.S. PATENT DOCUMENTS

| | | | |
|---|---|---|---|
| 6,119,102 A | 9/2000 | Rush et al. | |
| 6,151,582 A | 11/2000 | Huang et al. | |
| 6,175,876 B1 | 1/2001 | Branson et al. | |
| 6,182,060 B1 | 1/2001 | Hedgcock et al. | |
| 6,208,908 B1 | 3/2001 | Boyd et al. | |
| 6,226,623 B1 | 5/2001 | Schein et al. | |
| 6,236,977 B1 | 5/2001 | Verba et al. | |
| 6,237,138 B1 | 5/2001 | Hameluck et al. | |
| 6,249,768 B1 | 6/2001 | Tulskie et al. | |
| 6,263,315 B1 | 7/2001 | Talluri | |
| 6,275,812 B1 | 8/2001 | Haq et al. | |
| 6,286,005 B1 | 9/2001 | Cannon | |
| 6,321,133 B1 | 11/2001 | Smirnov et al. | |
| 6,321,206 B1 | 11/2001 | Honarvar | |
| 6,341,266 B1 * | 1/2002 | Braun | 705/7.26 |
| 6,341,269 B1 | 1/2002 | Dulaney et al. | |
| 6,397,224 B1 | 5/2002 | Zubeldia et al. | |
| 6,456,999 B1 | 9/2002 | Netz | |
| 6,470,344 B1 | 10/2002 | Kothuri et al. | |
| 6,484,179 B1 | 11/2002 | Roccaforte | |
| 6,502,077 B1 | 12/2002 | Speicher | |
| 6,526,526 B1 | 2/2003 | Dong et al. | |
| 6,546,135 B1 | 4/2003 | Lin et al. | |
| 6,553,352 B2 | 4/2003 | Delurgio et al. | |
| 6,560,501 B1 | 5/2003 | Walser et al. | |
| 6,581,068 B1 | 6/2003 | Bensoussan et al. | |
| 6,584,447 B1 | 6/2003 | Fox et al. | |
| 6,611,829 B1 | 8/2003 | Tate et al. | |
| 6,640,215 B1 | 10/2003 | Galperin et al. | |
| 6,643,659 B1 | 11/2003 | MacIssac et al. | |
| 6,728,724 B1 | 4/2004 | Megiddo et al. | |
| 6,735,570 B1 | 5/2004 | Lacy et al. | |
| 6,750,864 B1 | 6/2004 | Anwar | |
| 6,836,689 B2 | 12/2004 | Walser et al. | |
| 6,898,603 B1 | 5/2005 | Petculescu et al. | |
| 6,901,406 B2 | 5/2005 | Nabe et al. | |
| 6,907,382 B2 | 6/2005 | Urokohara | |
| 6,937,992 B1 | 8/2005 | Benda et al. | |
| 6,970,830 B1 | 11/2005 | Samra et al. | |
| 7,039,594 B1 | 5/2006 | Gersting | |
| 7,062,447 B1 | 6/2006 | Valentine et al. | |
| 7,068,267 B2 | 6/2006 | Meanor et al. | |
| 7,085,734 B2 | 8/2006 | Grant et al. | |
| 7,089,266 B2 | 8/2006 | Stolte et al. | |
| 7,092,896 B2 | 8/2006 | Delurgio et al. | |
| 7,092,918 B1 | 8/2006 | Delurgio et al. | |
| 7,092,929 B1 | 8/2006 | Delurgio et al. | |
| 7,130,811 B1 | 10/2006 | Delurgio et al. | |
| 7,133,876 B2 | 11/2006 | Roussopoulos et al. | |
| 7,133,882 B1 | 11/2006 | Pringle et al. | |
| 7,171,376 B2 | 1/2007 | Ramakrishnan | |
| 7,210,624 B1 * | 5/2007 | Birjandi et al. | 235/385 |
| 7,236,949 B2 | 6/2007 | Natan et al. | |
| 7,240,019 B2 | 7/2007 | Delurgio et al. | |
| 7,249,031 B2 | 7/2007 | Close et al. | |
| 7,251,615 B2 | 7/2007 | Woo | |
| 7,302,400 B2 | 11/2007 | Greenstein | |
| 7,302,410 B1 | 11/2007 | Venkaraman et al. | |
| 7,310,646 B2 | 12/2007 | Rangadass et al. | |
| 7,346,538 B2 | 3/2008 | Reardon | |
| 7,370,366 B2 | 5/2008 | Lacan et al. | |
| 7,379,890 B2 | 5/2008 | Myr et al. | |
| 7,395,255 B2 | 7/2008 | Li | |
| 7,440,903 B2 | 10/2008 | Riley et al. | |
| 7,505,482 B2 | 3/2009 | Adamczyk et al. | |
| 7,516,083 B1 | 4/2009 | Dvorak et al. | |
| 7,519,908 B2 | 4/2009 | Quang et al. | |
| 7,536,361 B2 | 5/2009 | Alberti et al. | |
| 7,617,119 B1 | 11/2009 | Neal et al. | |
| 7,668,761 B2 * | 2/2010 | Jenkins et al. | 705/28 |
| 7,689,456 B2 | 3/2010 | Schoeder et al. | |
| 7,747,339 B2 * | 6/2010 | Jacobus et al. | 700/99 |
| 7,752,067 B2 | 7/2010 | Fotteler et al. | |
| 7,756,945 B1 | 7/2010 | Andreessen et al. | |
| 7,798,399 B2 | 9/2010 | Veit | |
| 7,877,286 B1 | 1/2011 | Neal et al. | |
| 7,895,067 B2 | 2/2011 | Ramakrishnan | |
| 8,112,300 B2 * | 2/2012 | Harper | 705/7.26 |
| 2001/0047293 A1 | 11/2001 | Waller et al. | |
| 2002/0013757 A1 | 1/2002 | Bykowsky et al. | |
| 2002/0046096 A1 | 4/2002 | Srinivasan et al. | |
| 2002/0072953 A1 | 6/2002 | Michlowitz et al. | |
| 2002/0099678 A1 | 7/2002 | Albright et al. | |
| 2002/0107723 A1 | 8/2002 | Benjamin et al. | |
| 2002/0116237 A1 | 8/2002 | Cohen et al. | |
| 2002/0123930 A1 | 9/2002 | Boyd et al. | |
| 2002/0143669 A1 * | 10/2002 | Scheer | 705/28 |
| 2002/0169654 A1 | 11/2002 | Santos et al. | |
| 2002/0169655 A1 | 11/2002 | Beyer et al. | |
| 2002/0178049 A1 | 11/2002 | Bye | |
| 2002/0188499 A1 | 12/2002 | Jenkins et al. | |
| 2003/0023598 A1 | 1/2003 | Janakiraman et al. | |
| 2003/0028437 A1 | 2/2003 | Grant et al. | |
| 2003/0050845 A1 | 3/2003 | Hoffman et al. | |
| 2003/0078830 A1 | 4/2003 | Wagner et al. | |
| 2003/0083924 A1 | 5/2003 | Lee et al. | |
| 2003/0083925 A1 | 5/2003 | Weaver et al. | |
| 2003/0088458 A1 | 5/2003 | Afeyan et al. | |
| 2003/0097292 A1 | 5/2003 | Chen et al. | |
| 2003/0110072 A1 | 6/2003 | Delurgio et al. | |
| 2003/0110080 A1 | 6/2003 | Tsutani et al. | |
| 2003/0120584 A1 | 6/2003 | Zarefoss et al. | |
| 2003/0126010 A1 | 7/2003 | Barns-Slavin | |
| 2003/0126136 A1 | 7/2003 | Omoigui | |
| 2003/0167098 A1 | 9/2003 | Walser et al. | |
| 2003/0172007 A1 * | 9/2003 | Helmolt et al. | 705/28 |
| 2003/0172145 A1 | 9/2003 | Nguyen | |
| 2003/0208402 A1 | 11/2003 | Bibelnieks et al. | |
| 2003/0208420 A1 | 11/2003 | Kansal | |
| 2003/0220830 A1 | 11/2003 | Myr | |
| 2003/0229502 A1 | 12/2003 | Woo | |
| 2003/0236721 A1 | 12/2003 | Plumer et al. | |
| 2004/0093296 A1 | 5/2004 | Phelan et al. | |
| 2004/0103051 A1 | 5/2004 | Reed et al. | |
| 2004/0111388 A1 | 6/2004 | Boiscuvier et al. | |
| 2004/0111698 A1 | 6/2004 | Soong et al. | |
| 2004/0199781 A1 | 10/2004 | Erickson et al. | |
| 2004/0210489 A1 * | 10/2004 | Jackson et al. | 705/22 |
| 2004/0230475 A1 | 11/2004 | Dogan et al. | |
| 2005/0066277 A1 | 3/2005 | Leah et al. | |
| 2005/0096963 A1 | 5/2005 | Myr et al. | |
| 2005/0197896 A1 | 9/2005 | Veit et al. | |
| 2005/0198121 A1 | 9/2005 | Daniels et al. | |
| 2005/0256726 A1 | 11/2005 | Riley et al. | |
| 2005/0256753 A1 | 11/2005 | Veit et al. | |
| 2005/0262108 A1 | 11/2005 | Gupta | |
| 2005/0267901 A1 | 12/2005 | Irlen | |
| 2005/0288989 A1 | 12/2005 | Kim et al. | |
| 2005/0289000 A1 | 12/2005 | Chiang et al. | |
| 2006/0010067 A1 | 1/2006 | Notani et al. | |
| 2006/0047608 A1 | 3/2006 | Davis et al. | |
| 2006/0069598 A1 | 3/2006 | Schweitzer et al. | |
| 2006/0074728 A1 | 4/2006 | Schweitzer et al. | |
| 2006/0143030 A1 | 6/2006 | Wertheimer | |
| 2006/0235557 A1 | 10/2006 | Knight et al. | |
| 2006/0248010 A1 | 11/2006 | Krishnamoorthy et al. | |
| 2007/0050195 A1 | 3/2007 | Malitski | |
| 2007/0055482 A1 | 3/2007 | Goodermote et al. | |
| 2007/0100981 A1 | 5/2007 | Adamczyk et al. | |
| 2007/0136150 A1 | 6/2007 | Biancavilla et al. | |
| 2007/0174119 A1 | 7/2007 | Ramsey et al. | |
| 2007/0174146 A1 | 7/2007 | Tamarkin et al. | |
| 2007/0208608 A1 | 9/2007 | Amerasinghe et al. | |
| 2007/0223462 A1 | 9/2007 | Hite et al. | |
| 2007/0288296 A1 | 12/2007 | Lewis | |
| 2008/0077459 A1 | 3/2008 | Desai et al. | |
| 2008/0140581 A1 | 6/2008 | Mayer | |
| 2008/0140688 A1 | 6/2008 | Clayton et al. | |
| 2008/0208678 A1 | 8/2008 | Walser et al. | |
| 2008/0208719 A1 | 8/2008 | Sharma et al. | |
| 2009/0112675 A1 | 4/2009 | Servais | |
| 2009/0271241 A1 | 10/2009 | Pratt | |
| 2010/0114669 A1 * | 5/2010 | Birjandi et al. | 705/10 |
| 2010/0145501 A1 | 6/2010 | Guilbert et al. | |

| | | | |
|---|---|---|---|
| 2011/0071877 A1 | 3/2011 | Ettl et al. | |
| 2012/0179505 A1 | 7/2012 | McMains et al. | |
| 2012/0179506 A1 | 7/2012 | McMains et al. | |
| 2012/0179507 A1 | 7/2012 | McMains et al. | |

OTHER PUBLICATIONS

Armstrong, Ronald D. et al., The Multiple-Choice Nested Knapsack Model, Management Science, vol. 28, No. 1, pp. 34-43 (Jan. 1982).
Bales, Egon et al., "OCTANE: A New Heuristic for Pure 0-1 Programs," Operations Research, 2001 Informs, vol. 49, No. 2, pp. 207-225 (Mar.-Apr. 2001).
Balintty et al, Binary and Chain Comparisons with an Experimental Linear Programming Food Price Index, The Review of Economics and Statistics, vol. 52, No. 3, pp. 324-330 (Aug. 1970).
Baud, Nicolas et al., "Internal data, external data and consortium data for operational risk measurement: How to pool data properly?", Groupe de Recherche Operationnelle, Credit Lyonnais, France, pp. 1-18 (Jun. 1, 2002).
Beamon, "Supply chain design and analysis: models and methods," International Journal of Production Economics. 14 pp. (1998).
Bertsimas et al., Introduction to Linear Optimization Athena Scientific, Belmont, Massachusetts, (1997), pp. 505-506, 530.
Business Wire, "Perfect and Open Ratings Form Alliance to Provide Critical Supplier Performance Ratings to Private Exchanges and Net Markets," 3 pp. (Oct. 30, 2000).
Business Wire, "SAS and Kohl's Partner on Merchandise Intelligence Suite," downloaded from s/mi_mOEIN/is_2005_Jan_17/ai_n8695858/, 2 pp. (Jan. 17, 2005).
Chettri, Inderlal Singh et al., "Pre Pack Optimization: Increasing Supply Chain Efficiency", Cognizant Technology Solutions, pp. 1-26 (2008).
Cohen et al., "SAS/OR Optimization Procedures, with Applications to the Oil Industry," SAS Institute, SUGI Proceedings, 9 pp. (1994).
Cook et al., "Evaluating Suppliers of Complex Systems: A multiple criteria approach, "The Journal of the Operational Research Society, 8 pp. (Nov. 1992).
Data Mining News, Looking Past Automation, MarketSwitch Focuses on Optimization of Marketing Campaigns, Data Mining News, 3 pp. (May 10, 1999).
Data Model definition from Wikipedia, 18 pages, downloaded on Jun. 28, 2011 (18 pp.).
De Prisco et al., "On Optimal Binary Search Trees", Information Processing Letters, vol. 45, pp. 249-253 (Apr. 1993).
Enterprise Application Integration definition from Wikipedia, download on Jun. 28, 2011 (7 pp.).
Enterprise Information Integration definition from Wikipedia, downloaded on Jun. 28, 2011 (3 pp.).
Haupt, J, "Enterprise Wide Data Warehousing with SAP BW," SAP AG, pp. 1-38 (2004).
Hollander, Geoffrey, "Modell deftly parses customer characteristics", InfoWorld, vol. 20, No. 21, pp. 1-4, retrieved from Dialog, file 148 (May 25, 1998).
Horngren, Charles T. et al., "Cost Accounting a Managerial Emphasis", Tenth Edition, Chapter 14, pp. 497-534 (2000).
Howard, Philip, "Data Warehousing with SAS," Bloor Research, pp. 1-13 (2005).
i2 Technologies Inc., "Improving Service and Market Share with i2 Inventory Optimization: How superior inventory management can by deployed as a competitive weapon to drive the top and bottom line," pp. 1-26 (Aug. 2004).
i2 Technologies: i2 releases i2 five two-the complete platform for dynamic value chain management; flexible, intuitive, powerful solutions designed to help companies gain efficiencies and drive revenue, M2 Presswire, 4 pp. (Oct. 25, 2001).
Johnson, Ellis et al, Recent Developments and Future Directions in Mathematical Programming, IBM Systems Journal, vol. 31, No. 1, pp. 79-93 (1992).
Kearney, "Advances in Mathematical Programming and Optimization in the SAS System," SAS Institute, SUGI Proceedings, 12 pp. (1999).
Kelley, Dave, "Merchandise Intelligence: Predictive insights improve bottom line," RIS News, pp. 32 (Mar. 2006).
Lee, Eon-Kyung et al., "An effective supplier development methodology for enhancing supply chain performance," ICMIT, 6 pp. (2000).
Lee, Eon-Kyung et al., "Supplier Selection and Management system Considering Relationships in Supply Chain Management," IEEE Transactions on Engineering Management, 12 pp. (Aug. 2001).
Manchanda et al, The "Shopping Basket"; A Model for Multi-Category Purchase Incidence Decisions, Marketing Science, vol. 18, pp. 95-114 (Nov. 2, 1999).
McDonald, Kevin et al., "Mastering the SAP® Business Information Warehouse," Wiley Publishing, Inc., pp. 1-18, 35-88, and 279-332 (Sep. 2002).
Medaglia, Andres, "Simulation Optimization Using Soft Computing," dissertation for Operations Research Department at North Carolina State University, 2 pp. (Jan. 24, 2001).
Microsoft, MSDN, Chapter 5: Layered Application Guidelines, downloaded from http://msdn.rnicrosoft.com/en-us/library/ee658109(d=printer).aspx downloaded on Mar. 17, 2011 (10 pp.).
Microsoft, MSDN, Three-Layered Services Application, downloaded from http://msdn.microsoft.com/en-us/Jibrary/ff648105 (d=printer).aspx downloaded on Mar. 17, 2011 (6 pp.).
Millin, Vincent, Jun. 22, 2004 International Search Report from PCTIUS03/13394 (1 pg.).
Modell by Group 1 Software, www.gl.com, retrieved from Google.com and archive.org, pp. 1-16 (Aug. 29, 1999).
Multitier Architecture definition from Wikipedia downloaded on Mar. 17, 2011 (4 pp.).
Na, H.S. et al., "Data Scaling for Operational Risk Modelling", ERIM Report Series Research in Management, 24 pp. (Dec. 2005).
Pedersen et al., "Multidimensional Database Technology", IEEE, Computer, vol. 34, Issue 12, pp. 40-46 (Dec. 2001).
Peemoller, Fred A., "Operational Risk Data Pooling", Frankfurt/Main, Deutsche Bank AG, 38 pp. (Feb. 7, 2002).
Pisinger, David, "A Minimal Algorithm for the Multiple-Chaise Knapsack Problem", Technical Report 94/25, DIKU, University of Copenhagen, Denmark, pp. 1-23 (May 1984).
Porter-Kuchay, Multidimensional Marketing, Target Marketing, 4 pp. (Jan. 2000).
Ramirez, Ariel Ortiz, "three-Tier Architecture," Linux Journal, downloaded from http://www.linuxjournal.com/article/3508, 4 pp. (Jul. 1, 2000).
Renaud, Jacques et al., "A heuristic for the pickup and delivery traveling salesman problem," Computers and Operations Research, pp. 905-916 (2000).
Rosen, Michele, "There's Gold in That There Data", Insurance & Technology, vol. 23, No. 12, pp. 1-6 retrieved from Dialog, file 16 (Dec. 1998).
Saarenvirta, Data Mining to Improve Profitability, CMA Magazine, vol. 72, No. 2, pp. 8-12 (Mar. 1998).
Samudhram, Ananda, "Solver setting for optimal solutions," New Straits Times, 3 pp. (Nov. 22, 1999).
Schindler, Robert M. et al., "Increased Consumer Sales Response Though Use of 99-Ending Prices," Journal of Retailing, vol. 72(2), pp. 187-199, ISSN: 0022-4359 (1996).
Service-Oriented Architecture definition from Wikipedia downloaded on Jun. 28, 2011 (19 pp.).
Smith, Michael John Sebastian, "Application-Specific Integrated Circuits," Addison-Wesley Longman, Inc., Chapter 1: Introduction to ASICS, cover page and pp. 20-34. (1997).
Software as a Service definition from Wikipedia downloaded on Jun. 28, 2011 (7 pp.).
Spiegelman, "Optimizers Assist in Specialized marketing Efforts," Computer Reseller News, 1 pg (Nov. 22, 1999).
White, John W., "Making ERP Work the Way Your Business Works," Fuego, ERP White Paper, pp. 1-8 (2002).
Bolat, Ahmet et al., "A Surrogate Objective for Utility Work in Paced Assembly Lines," Technical Report 91-32, pp. 1-17 (Oct. 1991).
Hababou, Moez et al., "Variable Selection in the Credit Card Industry," NESUG (2006), 5 pp.
Scheiber, Thomas et al., "Surrogate time series," Physica D 142, pp. 346-382 (2000).

Siddiqi, Naeem, "Credit Risk Scorecards- Developing and Implementing Intelligent Credit Scoring," John Wiley & Sons, Inc., pp. 1-196 (2006).

MID, Inc. "Advanced Merchandise Planning, Store Planning and Allocation" 1 pg (2010).

DeVilliers, Noelene, "The evolution of the Merchandising Processes at Woolworths, SA" National Retail Federation, NRF 97th Annual Convention & Expo, 21 pp. (Jan. 13-16, 2008).

Torexretail, "Merchandise and Assortment Planning" (Feb. 2007), 6 pp.

Non-Final Office Action of May 10, 2011 for U.S. Appl. No. 12/111,312, 25 pages.

Final Office Action of Dec. 14, 2011 for U.S. Appl. No. 12/111,312, 25 pages.

Non-Final Office Action of Aug. 14, 2012 for U.S. Appl. No. 12/987,486, 27 pages.

Non-Final Office Action of Sep. 25, 2012 for U.S. Appl. No. 12/987,489, 29 pages.

Non-Final Office Action of Nov. 14, 2012 for U.S. Appl. No. 12/987,495, 29 pages.

Arnold, Jens et al., "Evolutionary Optimization of a Multi-location Inventory Model with Lateral Transshipments," Faculty of Informatics, Technical University of Chemnitz-Zwickau, 09107 Chemnitz, Germany, 11 pp. (1996).

Lee, Calvin B. Ph.D., "Multi-Echelon Inventory Optimization," Evant White Paper Series, pp. 1-13 (2003).

Mangal, Dharamvir et al., "Inventory Control in Supply Chain Through Lateral Transshipment—A Case Study in Indian Industry," International Journal of Engineering (IJE), vol. 3, Issue 5, pp. 443-457 (Jan. 2009).

Paterson, Colin et al., "Inventory Models with Lateral Transshipments: A Review," 19 pp. (Aug. 26, 2009).

Yang, Guangyuan et al., "Service Parts Inventory Control with Lateral Transshipment that takes Time," Tinbergen Institute Discussion Paper, TI 2010-025/4 (2010).

Aberdeen Group Research Brief, "IBM Puts a Pragmatic Face on Advanced Inventory Optimization," pp. 1-6 (Apr. 11, 2006).

Manhattan Associates, "Multi-Echelon Inventory Optimization," pp. 1-9 (2009).

SAS Institute Inc., "Service Parts Optimization: Inventory vs. availability," pp. 1-13 (2006).

* cited by examiner

| LOCATION | HOLDING COST ($/UNIT/WEEK) | ORDER LEAD-TIME (WEEKS) | REQUIRED SERVICE LEVEL (PERCENT) |
|---|---|---|---|
| DEPOT | 0.6 | 2 | 90 |
| W1 | 0.8 | 2 | 92 |
| W2 | 0.7 | 2 | 92 |
| R1 | 1.5 | 1 | 95 |
| R2 | 1.2 | 1 | 95 |
| R3 | 1.4 | 1 | 95 |
| R4 | 1.1 | 1 | 95 |

Fig. 9

| LOCATION | PERIOD | FORECAST MEAN | FORECAST VARIANCE |
|---|---|---|---|
| R1 | 1 | 5 | 1.6 |
| R1 | 2 | 8 | 2.5 |
| R1 | 3 | 7 | 9.5 |
| R2 | 1 | 3 | 1.6 |
| R2 | 2 | 2 | 2.5 |
| R2 | 3 | 5 | 9.5 |
| R3 | 1 | 15 | 1.6 |
| R3 | 2 | 18 | 2.5 |
| R3 | 3 | 15 | 9.5 |
| R4 | 1 | 5 | 1.6 |
| R4 | 2 | 8 | 3.5 |
| R4 | 3 | 7 | 2.5 |

Fig. 10

| LOCATION | PERIOD | INVENTORY AMOUNT |
|---|---|---|
| DEPOT | 1 | 200 |
| DEPOT | 2 | • |
| DEPOT | 3 | • |
| R1 | 1 | 26 |
| R1 | 2 | • |
| R1 | 3 | • |
| R2 | 1 | 3 |
| R2 | 2 | • |
| R2 | 3 | • |
| R3 | 1 | 5 |
| R3 | 2 | • |
| R3 | 3 | • |
| R4 | 1 | 16 |
| R4 | 2 | • |
| R4 | 3 | • |
| W1 | 1 | 160 |
| W1 | 2 | • |
| W1 | 3 | • |
| W2 | 1 | 6 |
| W2 | 2 | • |
| W2 | 3 | • |

Fig. 11

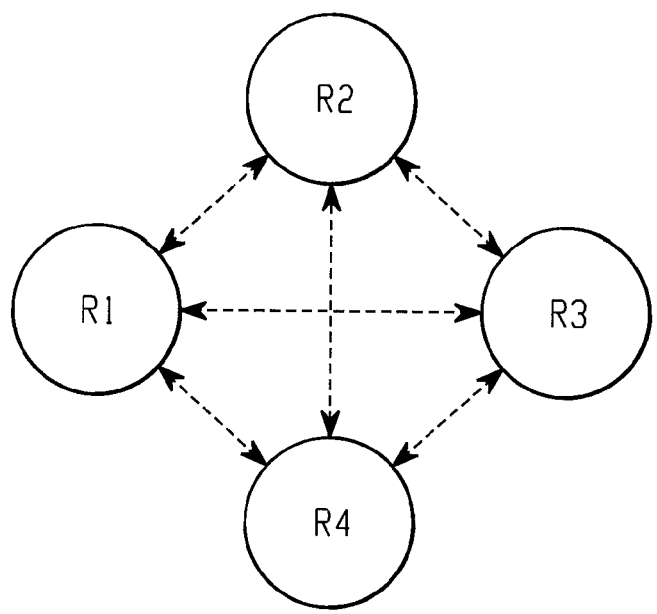
Fig. 12
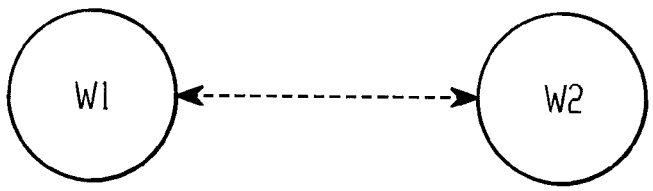
Fig. 13
| LOCATION | DELIVERY DELAY MEAN (WEEKS) | DELIVERY DELAY VARIANCE (WEEKS) |
|---|---|---|
| R1 | 0.023841 | 0.002878 |
| R2 | 0.013850 | 0.002879 |
| R3 | 0.030944 | 0.001712 |
| R4 | 0.020252 | 0.002123 |
| W1 | 0.052971 | 0.012198 |
| W2 | 0.059924 | 0.005744 |
| DEPOT | 0.095117 | 0.004074 |
Fig. 14

| SKU LOCATION | PERIOD | INVENTORY TARGET | OPTIMAL SCHEDULED RECEIPT |
|---|---|---|---|
| R1 | 1 | 15 | 6 |
| R1 | 2 | 19 | 9 |
| R1 | 3 | 19 | 0 |
| R1 | 4 | 19 | 0 |
| R1 | 5 | 19 | 0 |
| R2 | 1 | 8 | 5 |
| R2 | 2 | 13 | 3 |
| R2 | 3 | 16 | 0 |
| R2 | 4 | 16 | 0 |
| R2 | 5 | 16 | 0 |
| R3 | 1 | 34 | 15 |
| R3 | 2 | 34 | 18 |
| R3 | 3 | 34 | 0 |
| R3 | 4 | 34 | 0 |
| R3 | 5 | 34 | 0 |
| R4 | 1 | 16 | 6 |
| R4 | 2 | 18 | 9 |
| R4 | 3 | 17 | 0 |
| R4 | 4 | 17 | 0 |
| R4 | 5 | 17 | 0 |

Fig. 15

| LOCATION | AVERAGE SERVICE LEVEL (PERCENT) | TARGET SERVICE LEVEL (PERCENT) |
|---|---|---|
| R1 | 100 | 95 |
| R2 | 88 | 95 |
| R3 | 17 | 95 |
| R4 | 99 | 95 |

Fig. 16

| LOCATION | PERIOD | INVENTORY AMOUNT |
|---|---|---|
| DEPOT | 1 | 200 |
| DEPOT | 2 | 0 |
| DEPOT | 3 | 0 |
| R1 | 1 | 15 |
| R1 | 2 | 0 |
| R1 | 3 | 0 |
| R2 | 1 | 8 |
| R2 | 2 | 0 |
| R2 | 3 | 0 |
| R3 | 1 | 11 |
| R3 | 2 | 0 |
| R3 | 3 | 0 |
| R4 | 1 | 16 |
| R4 | 2 | 0 |
| R4 | 3 | 0 |
| W1 | 1 | 160 |
| W1 | 2 | 0 |
| W1 | 3 | 0 |
| W2 | 1 | 6 |
| W2 | 2 | 0 |
| W2 | 3 | 0 |

| LOCATION | PERIOD | INVENTORY AMOUNT |
|---|---|---|
| W1 | 1 | 97 |
| W1 | 2 | 0 |
| W1 | 3 | 0 |
| W2 | 1 | 6 |
| W2 | 2 | 63 |
| W2 | 3 | 0 |

Fig. 20

| SKU LOCATION | PERIOD | INVENTORY TARGET | OPTIMAL SCHEDULED RECEIPT |
|---|---|---|---|
| DEPOT | 1 | 46 | 3 |
| DEPOT | 2 | 66 | 23 |
| DEPOT | 3 | 66 | 20 |
| DEPOT | 4 | 68 | 0 |
| DEPOT | 5 | 67 | 0 |

Fig. 18

| LOCATION | PERIOD | INVENTORY TARGET | OPTIMAL SCHEDULED RECEIPT |
|---|---|---|---|
| W1 | 1 | 34 | 0 |
| W1 | 2 | 48 | 18 |
| W1 | 3 | 44 | 13 |
| W1 | 4 | 44 | 0 |
| W1 | 5 | 44 | 0 |
| W2 | 1 | 72 | 23 |
| W2 | 2 | 72 | 21 |
| W2 | 3 | 71 | 25 |
| W2 | 4 | 69 | 0 |
| W2 | 5 | 69 | 0 |

250 — Replenishment Order Details

▽ Item Details
Item:                       Item47360
Facility                    Facility15
Replenishment Plan Type:    Incomplete Replenishment
Plan ID:                    Primary0000047360
Order Amount:               17995

▽ Primary Source Orders (1)

252 —

| Source Facility | Lead Time (Period) | Suggested |
|---|---|---|
| Store B | 2 | |

254 — ▽ Alternative Source Orders (1)

| Source Facility | Excess Units | Delivery Time... | Sugge |
|---|---|---|---|
| Alternative | 9 | 4 | |

256 — ▽ Planned Order Receipts

|  | Current Per... |
|---|---|
| Projected Customer Demand | 10 |
| Variation of Internal Transfer Orders | 10 |
| Projected Internal Transfer Orders | 0 |
| Variation of Internal Transfer Orders | 0 |
| Reorder Level | 27 |
| Order-up-to Level | 28 |
| Suggested Order from Primary Channel | 9 |
| Suggested Receipt from Primary Channel | 0 |

258 — ▽ Replenishment Plan Metrics

| Total order amount: | 1000 |
|---|---|
| Total number of orders: | 47360 |
| Total projected cost: | $47,360.00 |
| Projected holding cost: | $1,000.00 |
| Projected transfer cost: | $47,360.00 |
| Projected penalty cost: | $2.00 |

Export replenishment plan to spreadsheet...

MATCH TO FIG. 21B

*Fig. 21A*

MATCH TO FIG.21A

| Order | Transfer Mode | Transfer Cost |
|---|---|---|
| 17,993 | Ground | $135.99 |

| sted O... | Transfer Mode | Transfer Cost |
|---|---|---|
| 2 | Train | $115.99 |

| Period 1 | Period 2 | Period 3 | Period 4 |
|---|---|---|---|
| 15 | 10 | 15 | |
| 15 | 15 | 18 | 4 |
| 0 | 0 | 0 | |
| 0 | 0 | 0 | |
| 27 | 27 | 27 | 2 |
| 28 | 28 | 28 | 2 |
| | | | |
| 0 | 0 | 0 | 0 |

Projected service level: (%):       45.67
Target service level (%):            3.45
Service level upper bound (%):       2.34
Service level lower bound (%):      12.34

[Cancel] [Help]

*Fig. 21B*

SYSTEMS AND METHODS FOR MULTI-ECHELON INVENTORY PLANNING WITH LATERAL TRANSSHIPMENT

FIELD

The technology described in this patent document relates generally to inventory optimization and management.

BACKGROUND AND SUMMARY

In a typical supply chain network each location replenishes inventory from a primary supplier. In many business environments, however, locations may also source inventory from alternative suppliers when their primary supplier is out of stock or cannot deliver inventory on time. With the availability of alternative suppliers, excess inventory in the network may be distributed so that orders can be fulfilled with lower cost and a faster delivery time. This is referred to as multi-echelon inventory planning with lateral transshipment.

In accordance with the teachings described herein, systems and methods are provided for optimizing inventory in a multi-echelon inventory distribution network having at least a first echelon and a second echelon. An example method may include the steps of: receiving information identifying an inventory pool that includes at least two inventory locations within the first or second echelons; determining inventory excesses or shortages at inventory locations within the inventory pool; determining an inventory transshipment plan for transferring inventory between two or more of the inventory locations in the inventory pool based at least in part on the inventory excesses or shortages; and determining an inventory replenishment plan for replenishing inventory at one or more inventory locations in the first echelon from one or more primary supply locations in the second echelon, the inventory replenishment plan being based at least in part on the inventory excesses or shortages and accounting for any inventory transfers identified in the inventory transshipment plan.

Another example method of optimizing inventory in a multi-echelon inventory distribution network may include the steps of: determining optimum inventories for a plurality of inventory locations in a first echelon of the multi-echelon inventory distribution network based at least in part on a demand forecast; determining inventory excesses or shortages at the plurality of inventory locations in the first echelon based at least in part on a comparison between the optimum inventories for the plurality of inventory locations in the first echelon with actual inventories for the plurality of inventory locations in the first echelon; determining inventory transshipments between two or more inventory locations in the first echelon based at least in part on the inventory excesses or shortages at the plurality of inventory locations in the first echelon; and determining inventory replenishments from one or more inventory locations in a second echelon of the multi-echelon inventory distribution network to the plurality of inventory locations in the first echelon, the inventory replenishments being based at least in part on the inventory excesses or shortages at the plurality of inventory locations in the first echelon accounting for the inventory transshipments between the two or more inventory locations in the first echelon. Embodiments of the method may also include the step of: estimating delivery delays for inventory replenishments between inventory locations in two or more echelons of the multi-echelon inventory distribution network, wherein the optimum inventories for the plurality of inventory locations in the first echelon is further based on the estimated delivery delays.

A system for optimizing inventory in a multi-echelon inventory distribution network having at least a first echelon and a second echelon may include one or more processors, one or more memory devices, and central inventory optimization software stored on the one or more memory devices and executable by the one or more processors. When executed by the one or more processors, the central inventory optimization software may be configured to: receive information identifying an inventory pool that includes at least two inventory locations within the first or second echelons; determine inventory excesses or shortages at inventory locations within the inventory pool; determine an inventory transshipment plan for transferring inventory between two or more of the inventory locations in the inventory pool based at least in part on the inventory excesses or shortages; and determine an inventory replenishment plan for replenishing inventory at one or more inventory locations in the first echelon from one or more primary supply locations in the second echelon, the inventory replenishment plan being based at least in part on the inventory excesses or shortages and accounting for any inventory transfers identified in the inventory transshipment plan.

BRIEF DESCRIPTION OF THE DRAWINGS

FIG. 8-20 provide an example to illustrate how an optimal multi-echelon inventory plan with lateral transshipment may be determined using the systems and methods described herein.

FIGS. 21A and B are an example of an optimized inventory replenishment and transshipment plan that may be generated using the systems and methods described herein.

DETAILED DESCRIPTION

Figure 1:
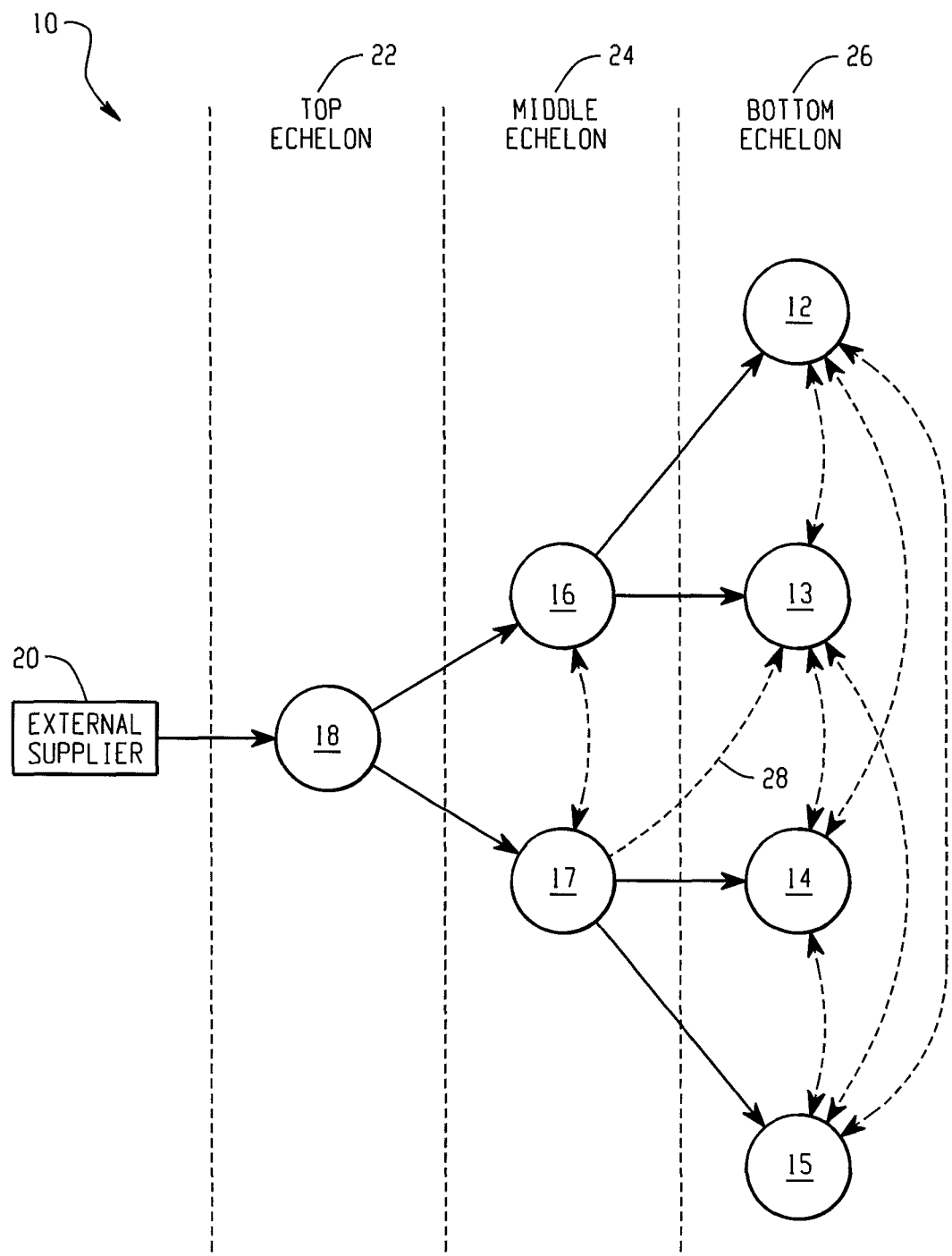
FIG. 1 illustrates an example of a multi-echelon supply chain network with lateral transshipment.

FIG. 1 illustrates an example of a multi-echelon supply chain network 10 with lateral transshipment. The illustrated example includes three echelons of inventory locations 12-18 (also referred to herein as nodes) and an external supplier 20. The top echelon 22 includes a single inventory location 18 that is supplied by the external supplier 20. The middle echelon 24 includes two inventory locations 16, 17, and the bottom echelon 26 includes four inventory locations. The solid arrows in FIG. 1 illustrate pathways for down-stream inventory replenishment (i.e., inventory replenishment from a primary supplier). Specifically, the inventory location 18 in the top echelon 22 replenishes inventory for the two inventory locations 16, 17 in the middle echelon 24, and the inventory locations 16, 17 in the middle echelon 24 each replenish inventory for two locations 12, 13 and 14, 15 in the bottom echelon 26.

In addition, the multi-echelon supply chain network 10 also provides for lateral transshipment of inventory from alternative suppliers, as illustrated by the dotted arrows in FIG. 1. Lateral transshipments may include transshipments of inventory between locations in the same echelon or transshipments from an alternative supplier in a different echelon. For instance, the example network shown in FIG. 1 illustrates routes for lateral transshipment between each of the locations 12, 13, 14, 15 in the bottom echelon 26 and between the two locations 16, 17 in the middle echelon. In addition, FIG. 1 illustrates one example of a lateral transshipment route 28 from an alternative supplier 17 in the middle echelon 24 to an inventory location 13 in the bottom echelon 26. It should be understood that other lateral transshipment routes are also possible.

Multi-echelon inventory optimization has recently captured a lot of attention from executives because of its potential for expedited ordering and reduced costs. However, the problems of optimizing standard inventory replenishment (i.e., shipments from the primary supplier) and optimizing inventory transshipments (i.e., shipments from an alternative supplier) have traditionally been addressed separately. Accordingly, typical inventory transshipment plans do not account for uncertainties in the supply chain. These uncertainties, such as variations in demand and delivery, are ubiquitous and should be addressed in order to derive an optimal inventory control policy.

Figure 2:
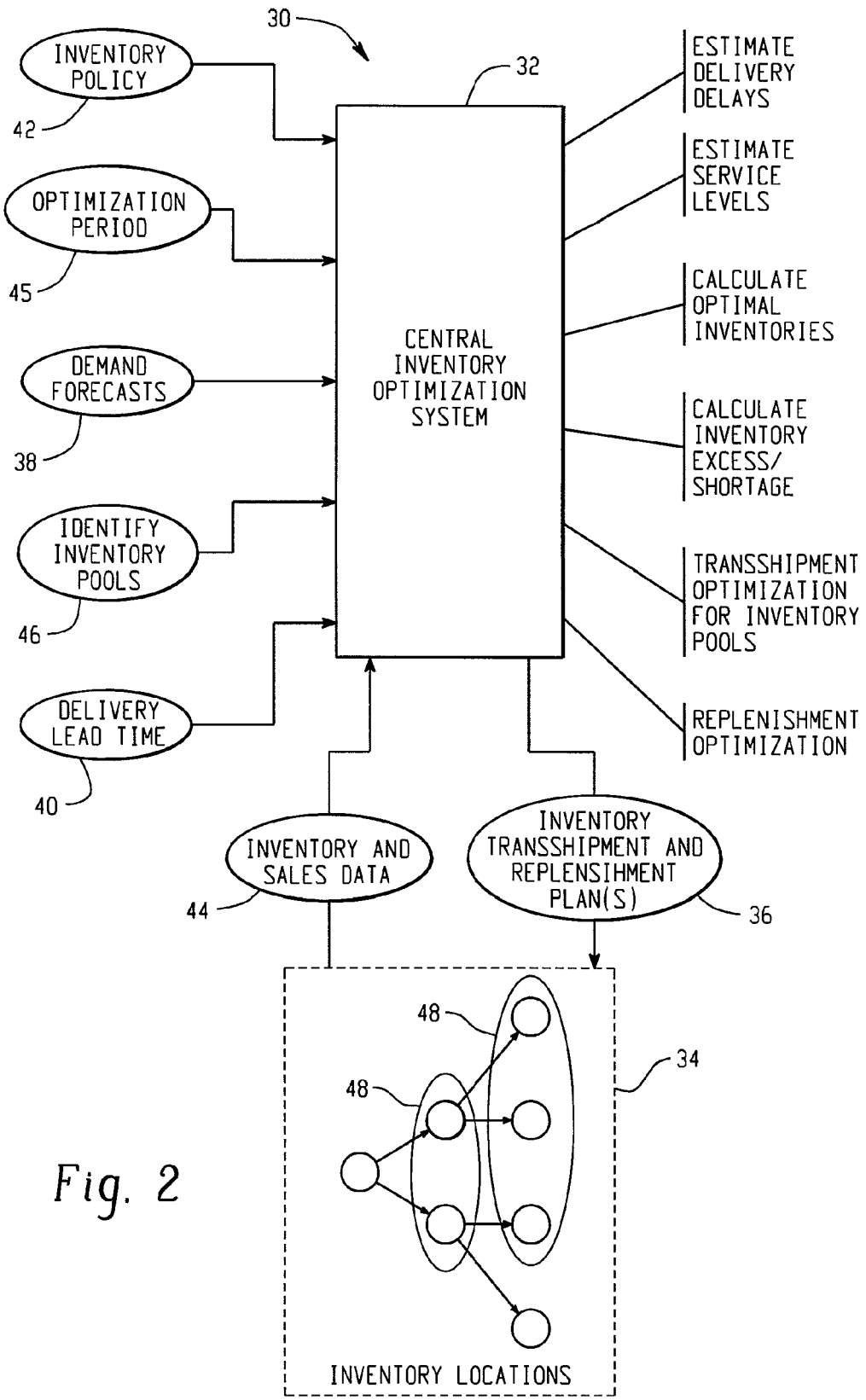
FIGS. 2-4 is a block diagrams of example systems for optimizing a multi-echelon inventory plan with lateral transshipment.

FIG. 2 is a block diagram of an example system 30 for optimizing a multi-echelon inventory plan with lateral transshipment. The system 30 includes a central inventory optimization system 32 and a multi-echelon network of inventory locations 34. The central inventory optimization system 32 may be provided by software instructions stored in a memory device(s) and executed by one or more processors, for example as described below with reference to FIG. 22. The central inventory optimization system 32 generates one or more integrated inventory plans 36 that are optimized for the multi-echelon network 34 with lateral transshipment based on supply and demand across the network.

The inventory plan(s) 36 is optimized based on supply and demand data, such as a demand forecast 38, the delivery lead time 40 for one or more locations, and an inventory policy 42. The inventory policy 42 may, for example, define one or more constraints on inventory replenishment and/or transshipment, such as a minimum order size, a predefined time period between inventory replenishments, etc. The demand forecast 38 may, for example, be generated from historical data (e.g., inventory and sales data 44 received from the inventory network locations) using forecasting software, such as the SAS® Demand Driven Forecasting for Retail and SAS® High-Performance Forecasting software sold by SAS Institute Inc of Cary, N.C. In addition, the central inventory optimization system 32 may receive additional inputs used in the optimization process, such as an input 45 identifying the optimization period and an input 46 identifying one or more inventory pools 48 for transshipments. It should be understood that the inputs to the central inventory optimization system 32 may be received from one or more application interfaces that are configured to receive user input or may be received from one or more other software applications.

In operation, the central inventory optimization system 32 may determine the optimum inventory for individual locations in the network 34 based on the inventory demand forecast 38 and an estimated delivery delay for inventory replenishments (i.e., inventory shipments from a primary supplier). An example method for determining the estimated delivery delay at an inventory location is described below with reference to FIGS. 6 and 7. The estimated inventory excesses or shortages at the individual network locations may then be determined by comparing the optimum inventory at a location with the actual (i.e., current) inventory at that location. The actual inventory data may, for example, be determined from inventory and sales data 44 received by the central inventory optimization system 32 from the network locations 34. In certain examples, the central inventory optimization system 32 may also estimate average service levels at the individual network locations and utilize the service level estimates in its determination of the estimated inventory excesses or shortages.

Figure 3:
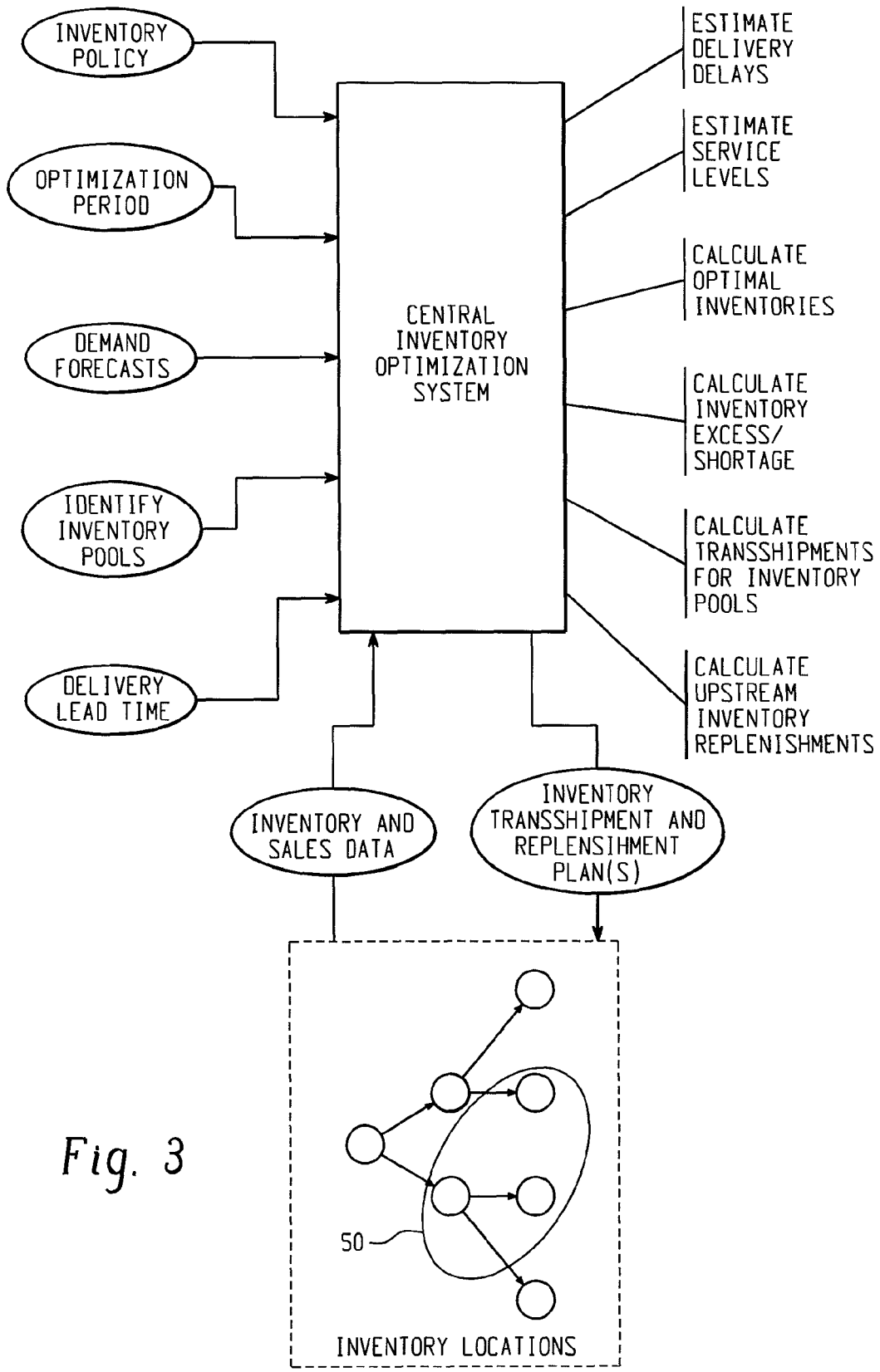

Using the estimated inventory excesses or shortages, the central inventory optimization system 32 may determine an optimal transshipment plan for allocating inventory within the identified inventory pools 48. Inventory pools 48 are defined (e.g., by input 46) to include locations within the network 34 that may share inventory. As shown in FIG. 2, one or more inventory pools 48 may be defined to include multiple inventory locations within an echelon. Alternatively, one or more inventory pools 50 may be defined to include an alternative supply node(s) from a different echelon, as shown in the example illustrated in FIG. 3. The transshipment optimization identifies the optimal way to allocate inventory within an inventory pool, that is, how much inventory should be moved from locations with excess inventory to locations with an inventory shortage. The transshipment optimization plan 36 may also identify other transshipment information, such as a transportation mode for the inventory shipments.

Having determined the optimal inventory transshipments, the central inventory optimization system 32 may then update the on-hand and pipeline inventory with the transshipment results and use the updated inventory conditions to determine the optimal inventory replenishments for the individual network locations. That is, the optimal inventory replenishments may be determined based on the estimated inventory excesses or shortages at the individual network locations accounting for any inventory transshipments. The optimal inventory transshipment and replenishment data may, for example, then be included in one or more comprehensive inventory plans 36 for use by the network 34. One example of an inventory transshipment and replenishment plan is described below with reference to FIGS. 21A and B.

The central inventory optimization system 32 performs the above-described inventory optimization calculations one echelon at a time, starting with the bottom echelon. In this way, the inventory optimization calculations for the higher echelons account for the optimal replenishments (and possibly transshipments) to the downstream locations. An example method that may be used by the central inventory optimization system 32 for determining an optimal transshipment and replenishment plan for individual locations in a multi-echelon network is described below with reference to FIG. 5.

Figure 4:
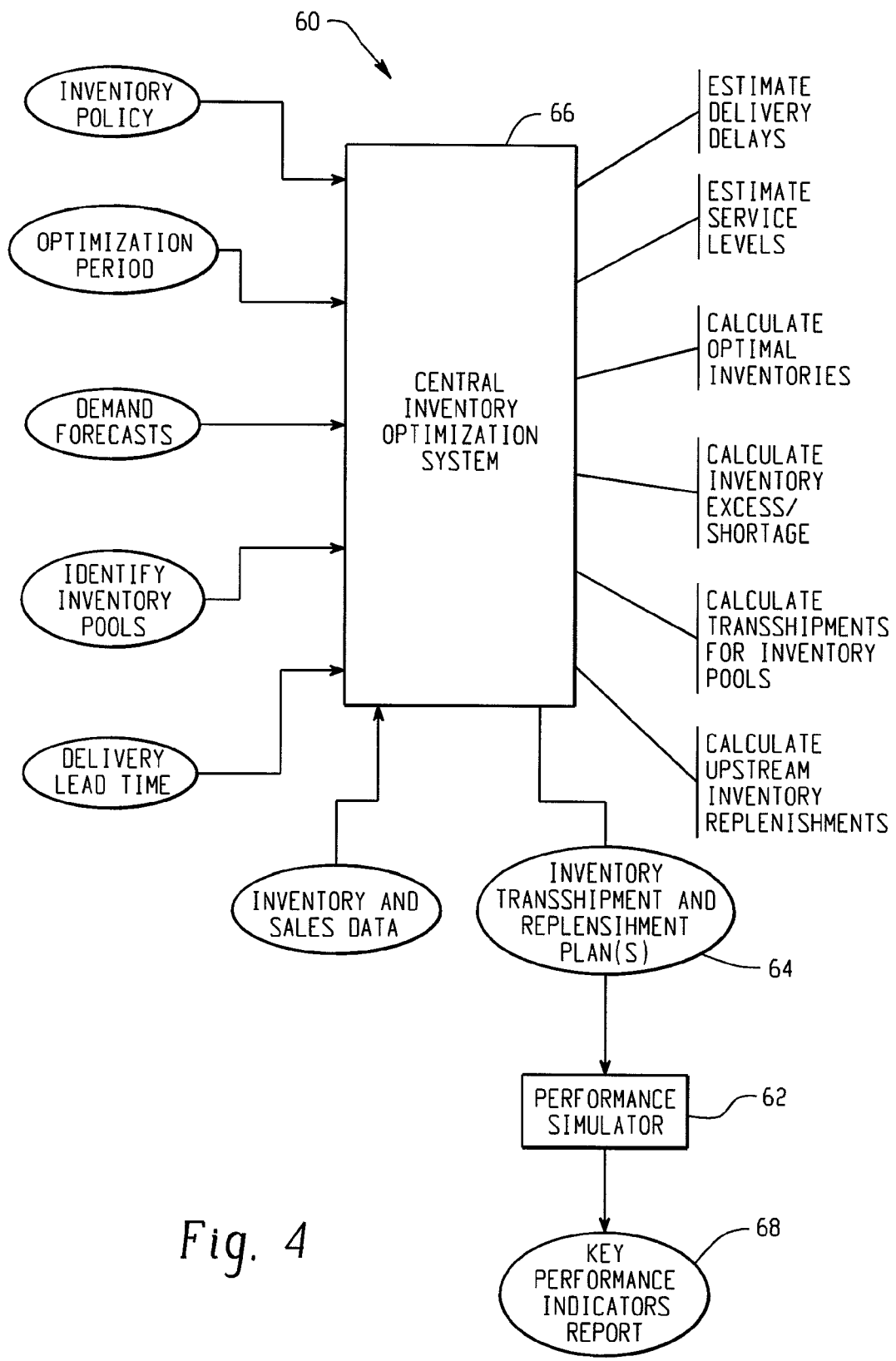

FIG. 4 is a block diagram of another example system 60 for optimizing a multi-echelon inventory plan with lateral transshipment. In this example, the system 60 also includes a performance simulator 62 that may be used to evaluate the performance of an inventory plan 64 generated by the central inventory optimization system 66. The performance simulator 62 may be provided by software instructions stored in a memory device(s) and executed by one or more processors, for example as described below with reference to FIG. 22. In certain examples, the performance simulator 62 may operate on the same computer or server as the central inventory optimization system 66. In another example, the performance simulator 62 and central inventory optimization system 66 may operate on separate computers or servers that are connected via a computer network.

In operation, the performance simulator 62 may be used to simulate the implementation of the inventory plan 64 within a model of the multi-echelon network over a predetermined evaluation period to generate a performance report, such as a key performance indicators (KPI) report 68. For example, the performance simulator 62 may receive inventory data from the central inventory optimization system 66, such as the calculated optimal inventory, the inventory and sales data, the delivery lead time, order constraints, etc., and use the data to simulate an order replenishment process over one or more time periods at each node of the network based on a random demand generated from downstream nodes. The performance report 68 may, for example, identify the mean and variance of key performance indicators (KPIs), such as service level (e.g., fill rate, ready rate and backorder ratio), the inventory on hand, the inventory cost, the ordering quantity, and the inventory receipt.

Figure 5:
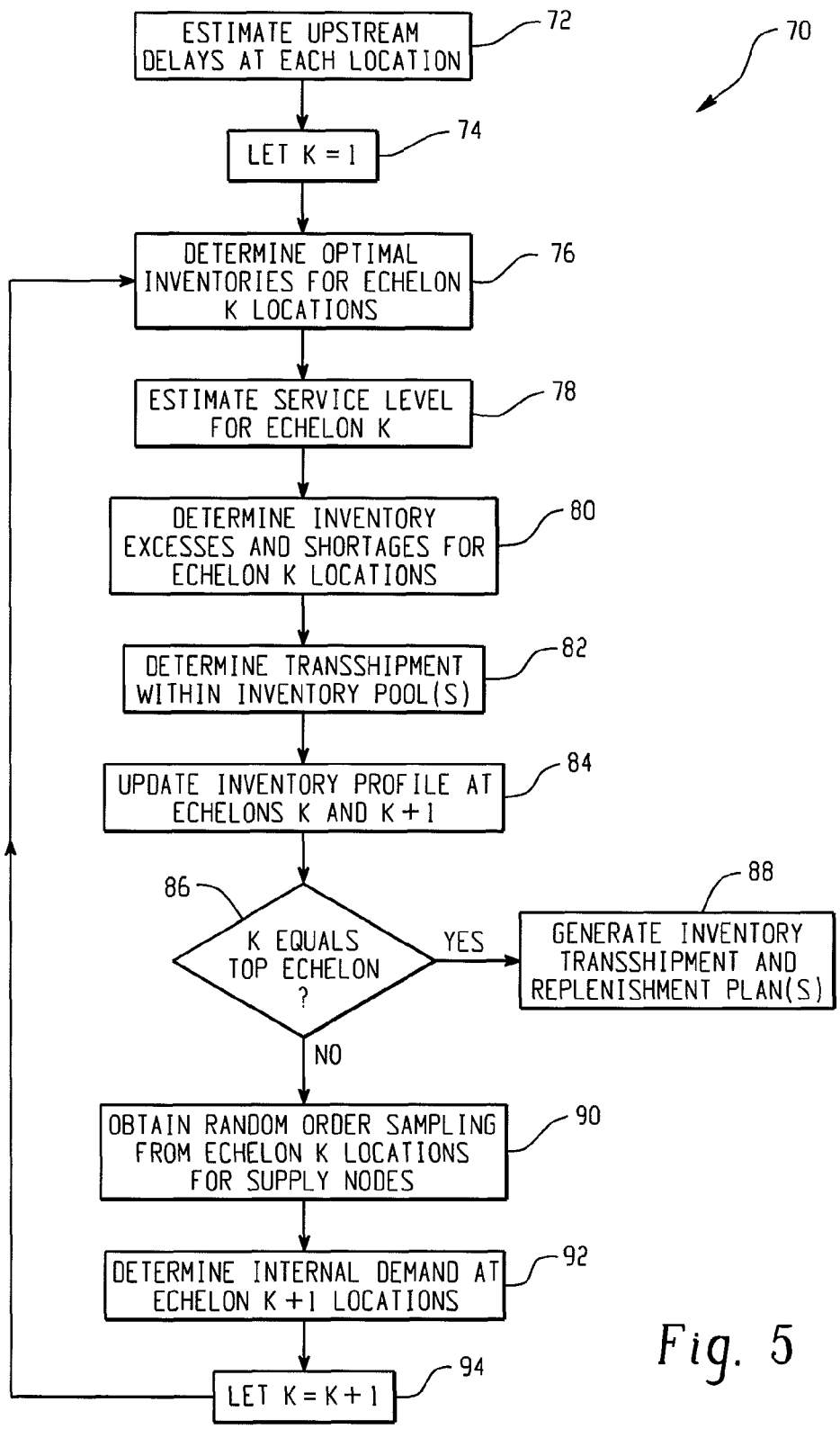
FIG. 5 is a flow diagram of an example method for optimizing a multi-echelon inventory plan with lateral transshipment.

FIG. 5 is a flow diagram of an example method 70 for optimizing a multi-echelon inventory plan with lateral transshipment. In step 72, the upstream delays for each location in a multi-echelon supply network are estimated. This estimation may entail calculating the mean and variance of delivery delays at each location, taking into account mid- or long-term demand forecasts and interactions between locations in a network. The upstream delays may, for example, be estimated using a simulation-based optimization method, such as an infinitesimal perturbation analysis, that supports various service level requirements and replenishment constraints. An example method for estimating the upstream delivery delays is described below with reference to FIGS. 6 and 7.

In step 74, the method is initialized (setting k=1) so that the optimization procedure starts at the bottom echelon of inventory locations. As explained below, steps of the method are repeated for each echelon in the network so that inventory optimization calculations for the higher echelons take into account any replenishments or transshipments to the downstream locations. The echelon for which optimization calculations are currently being performed is referred to in FIG. 5 as echelon k.

At step 76, the optimal inventory policies are determined for each location in echelon k based on the demand forecast, estimated delivery delays from upstream locations, and possibly other constraints such as the planned inventory receipt, holding cost, order lead-time and required service level at each location. The optimal inventory policy at each location may be determined over a protection interval having a number of periods. The protection interval may be determined as the sum of a lead-time and inventory review interval, and the optimal inventory for each period of the protection interval may be the amount needed in order to satisfy the service level requirement with minimum cost. The optimal inventory policy for each inventory location may, for example, be determined using simulation-based policy optimization. For example, the following simulation sequence may be used to determine an optimal inventory policy for each interval (t) in a planning horizon (T):

(1) Initialization:
  $I^-(t)=s(1)$;
  $SR(k)=0$ for all $k=0, 1, \ldots, k\ max+1$;
  PDC=0;
  $\alpha=0$;
  TD=0;

(2) Simulation replication r, for t=1 to T:
  (i) $IP(t)=I^-(t)+\Sigma_k SR(k)$;
  (ii) If $IP(t) \leq s(t)$, then $OQ(t,r)=S(t)-P(t)$;
  (iii) If $Q>0$, then $OQ(t,r)=[OQ(t,r)/Q] \times Q$;
  (iv) If $OQ(t,r)>0$ and $OQ(t,r)<Q\ min$, then set $OQ(t,r)=Q\ min$;
  (v) If $OQ(t,r)>Q\ max$, then set $OQ(t,r)=Q\ max$;
  (vi) If the lead time (L) is random, then draw a lead time sample, k;
  (vii) $SR(k)=SR(k)+OQ(t,r)$;
  (viii) $I(t)=I^-(t)+SR(0)$;
  (ix) $I^+(t)+I(t)-D(t,r)$;
  (x) If $D(t,r)>0$, then $PDC=PDC+1$ and $TD=TD+D(t,r)$;
  (xi) If $D(t,r)>0$ and $I^+(t)>=0$, then $\alpha=\alpha+1$,
(3) If r=R, then $\alpha=\alpha/PDC$,
WHERE:
  k=receiving period;
  t=time period (t=1, 2, ... T);
  r=simulation replication (r−1, 2, ... R);
  T=planning horizon;
  R=number of replications;
  L=lead time (random);
  Q=batch size;
  Qmin=minimum order size;
  Qmax=maximum order size;
  S(t)=order up-to level of a node at period t;
  s(t)=reorder level of a node at period t;
  D(t,r)=demand sample at period t in the $r^{th}$ replication;
  $\alpha$=average ready state (service level);
  OQ(t,r)=order quantity at period t in the $r^{th}$ replication;
  IP(t)=inventory position at period t;
  SR(k)=delivery scheduled to be received period k from now;
  $I^-(t)$=on-hand and backlog amount at the beginning of period t before delivery;
  $I^+(t)$=on-hand and backlog amount at the beginning of period t after delivery;
  PDC=total number of positive demand;
  TD=total demand over the simulation run.

With reference again to FIG. 5, in step 78, the average service level during the protection interval is estimated for echelon k based on the current on-hand and pipeline inventory. The service level may, for example, be estimated using a simulation analysis. For instance, in one example, the service level may be determined using the simulator 62 shown in FIG. 4. For instance, the service level ready rate may be determined by the simulator 62 and used to measure a node's ability to fulfill orders from downstream nodes or from external customers. For example, if we assume an average demand of 100 units for node D in the simulation, and on average 95 units can be satisfied directly from stock, then the average fill rate of node D will be 95%.

At step 80, the inventory excesses or shortages are determined for each location in echelon k. For example, locations with an average service level higher than a predefined target level may be considered candidates for excess inventory. The following formula may be used to calculate excess inventory at a location over the protection level:

$$ExcessInventory = \min\left\{ \left[\sum_{t=1}^{1} I_t - O_t\right], \left[\sum_{t=1}^{2} I_t - O_t\right], \ldots, \left[\sum_{t=1}^{n} I_t - O_t\right], \left[\sum_{t=1}^{n} I_t - OUTL\right] \right\},$$

where n is the number of periods in the protection interval;

Ot is the optimal amount at period t;

It is the delivery amount at period t (note that period 1 is the current period and $I_1$ is the amount of on-hand inventory at the current period); and OUTL is the order-up-to level (i.e., the target inventory level) at the current period.

Locations with an average service level lower than the predefined target level may be considered candidates for an inventory shortage. Inventory shortages for a period t in the protection interval may be calculated as follows:

$$\text{InventoryShortage} = \max\{0, Ot-It\}.$$

At step 82, an inventory pool(s) is defined to include locations that are allowed to share inventory. The inventory pool(s) may be customizable to support various business requirements. For example, an inventory pool may include only peer locations in the current echelon or peer locations in upper echelons. Also, in certain embodiments, more than one inventory pool may be defined. For example, one inventory pool many include only peer locations (i.e., locations within the same echelon) and another inventory pool may include upstream locations. In addition, inventory pools may provide for a preference. For instance, if multiple pools are defined, one pool may be given transshipment preference over another pool. Once the inventory pool(s) are defined, an optimal transshipment plan may be determined to allocate inventory within the identified inventory pool(s), i.e., to identify how much inventory should be moved from locations within the pool(s) with excess inventory to locations with an inventory shortage. The inventory plan may also identify other transshipment criteria, such as a transportation mode. The optimal transshipment plan may, for example, be based on a tradeoff between inventory holding cost, transshipment cost and stock-out penalty cost subject to order constraints, such as batch size and minimum order amount.

The transshipment problem used to produce the optimal transshipment plan may, for example, be a mixed integer problem that solves the re-balance of products between locations in order to minimize inventory holding cost, transportation cost, and stock-out penalty cost. In one example, the optimal transshipment plan may be determined using an optimization model according to the following process:

Step 0: Identify excess inventory locations (step 80 of FIG. 5).

Step 1: For each excess inventory location, determine the minimum cumulative difference, which is the amount that can be transshipped from an excess inventory location without hurting its stock-out probability. The minimum cumulative difference value is set to $e_i$ (excess inventory at i), where I is the index for the excess inventory locations.

Step 2: Eliminate locations for which ei=0 (because these locations will not be able to make any inventory transshipments even if they appear to be in an excess inventory state). If the set (i) is empty, then go to step 7.

Step 3: Identify all locations that are successors to the excess inventory locations remaining after step 2. Set index j for these locations.

Step 4: Eliminate the index j locations from step 3 that are not in deficit. If set j is empty, then go to step 7.

Step 5: Using the list of excess locations I and deficit locations j, formulate the transshipment optimization problem and solve, e.g., using the optimization algorithm set forth below.

Step 6: Update the inventory profile based on the results from step 5.

Step 7: End.

Example Optimization Algorithm for Step 5:

(i) Notation:

N: set of all networks indexed by n;

I: set of all excess inventory locations indexed by i;

J: set of all deficit inventory locations indexed by j;

K: set of all locations indexed by k, where K=I+J;

T: time periods indexed by t;

M: set of modes for transshipment indexed by m;

Q: very large integer (e.g., 2^32 in a 32-bit computer);

$cd_{nkt}$: cumulative difference amount for locations k at period t in network n;

$e_{ni}$: current excess inventory for location i in network n, where $e_{ni} = \min_t(cd_{nit})$;

$h_{nk}$: holding cost for location k in network n;

$p_{nk}$: penalty cost for location k in network n;

$c_{nijm}$: transportation cost of shipping one unit of inventory from i to j using Mode m in network n;

$b_{nijm}$: batch size from I to j using Mode m in network n;

$\beta_{nijm}$: multiple of batch size $b_{nijm}$;

$w_{nijm}$: fixed transportation cost from i to j using Mode m in network n;

$\alpha_{nijm}$: holding cost during transition ratio between i and j;

$l_{nijm}$: lead-time from i to j using Mode m in network n;

$\min_{nijm}$: minimum number to transship from i to j using mode m in network n;

$\max_{nijm}$: maximum number to transship from i to j using mode m in network n.

(ii) Decision Variables:

$X_{nijtm}$: amount to ship from i to j using mode m, which has a lead-time of $l_{nijm}$=t−1 (where period 1 is the current period). (This means that $X_{nijtm}$ will be shipped from i in this current period and j will receive $X_{nijtm}$ at period t.)

$cd^*_{nkt}$: Final cumulative difference after transshipments for location k at period t in network n.

$cd^{*+}_{nkt}$: Max($cd^*_{nkt}$, 0)

$cd^{*-}_{nkt}$: Min($cd^*_{nkt}$, 0)

$Y_{nijtm}$: 0-1 decision variable. Takes value of 1 when $X_{nijtm}$>0.

(iii) Optimization Model:

minimize $\Sigma_n\Sigma_t\Sigma_k cd^{*+}_{nkt}h_{nk}+\Sigma_n\Sigma_t\Sigma_k -cd^{*-}_{nkt}p_{nk}+\Sigma_n-\Sigma_t\Sigma_i\Sigma_j\Sigma_m(c_{nijm}+\alpha_{nijm}h_{ni}+(1-\alpha_{nijm})h_{nj})X_{nijtm}+\Sigma_n\Sigma_t\Sigma_i\Sigma_j\Sigma_m w_{nijt}Y_{nijtm}$ (1)

subject to $cd^*_{nit}=cd_{nit}-\Sigma_j\Sigma_t\Sigma_m X_{nijtm}$ for all $i$ and $t$ in $n$. (2)

$e_{ni}>=\Sigma_j\Sigma_t\Sigma_m X_{nijtm}$ for all $i$ in $n$. (3)

$cd^*_{njt}=cd_{njt}+\Sigma_i\Sigma_{(1 \text{ to } t)}\Sigma_m X_{nijtm}$, for all $j$ and $t$ in $n$. (4)

$X_{nijtm}<=\max_{nijm}$ for all $i, j, t$ and $m$ in $n$. (5)

$\min_{nijm}-X_{nijtm}<=Q(1-Y_{nijtm})$ for all $i, j, t$ and $m$ in $n$. (6)

$X_{nijtm}<=QY_{nijtm}$ for all $i, j, t$ and $m$ in $n$. (7)

$X_{nijtm}=\beta_{nijtm}b_{nijtm}$ for all $i, j, t$ and $m$ in $n$. (8)

$X_{nijtm}>=0$ only for $t=1+l_{nijm}$, =0 o.w. for all $i, j, t$ and $m$ in $n$. (9)

$Y_{nijtm}=\{0,1\}$ for all $i, j, t$ and $m$ in $n$. (10)

At step 84, the on-hand and pipeline inventory are updated based on the transshipment plan for echelon k, as established in step 80. Then, at step 86, the method determines if echelon k is the top echelon of the network (i.e., whether all of the echelons have been evaluated.) If the method has not reached the top echelon, then it proceeds to step 90. Otherwise, once all of the echelons have been evaluated, the method proceeds to step 88 to generate one or more inventory transshipment and replenishment plans for the multi-echelon network, for example as illustrated in FIGS. 21A and B.

At step 90, the updated inventory conditions are used to determine the optimal inventory replenishment quantities for the individual network locations in echelon k from their primary supply nodes. The optimal inventory replenishments may, for example, be determined using an order generation process that determines order quantities based on optimal policy and current inventory position (on hand+pipeline−backorder), where order quantity=optimal inventory target−inventory position. For instance, in one example, the optimal inventory replenishments may be determined using the MIRP procedure provided by the SAS® Inventory Optimization software sold by SAS Institute Inc of Cary, N.C.

At step 92, the internal demand at locations in the next echelon (echelon k+1) is determined based on the inventory replenishment quantities determined at step 90. The method then increments to the next echelon (k=k+1) at step 94, and the method returns to step 76.

It should be understood that similar to the other processing flows described herein, one or more of the steps and the order in the flowchart may be altered, deleted, modified and/or augmented and still achieve the desired outcome.

Figure 6:
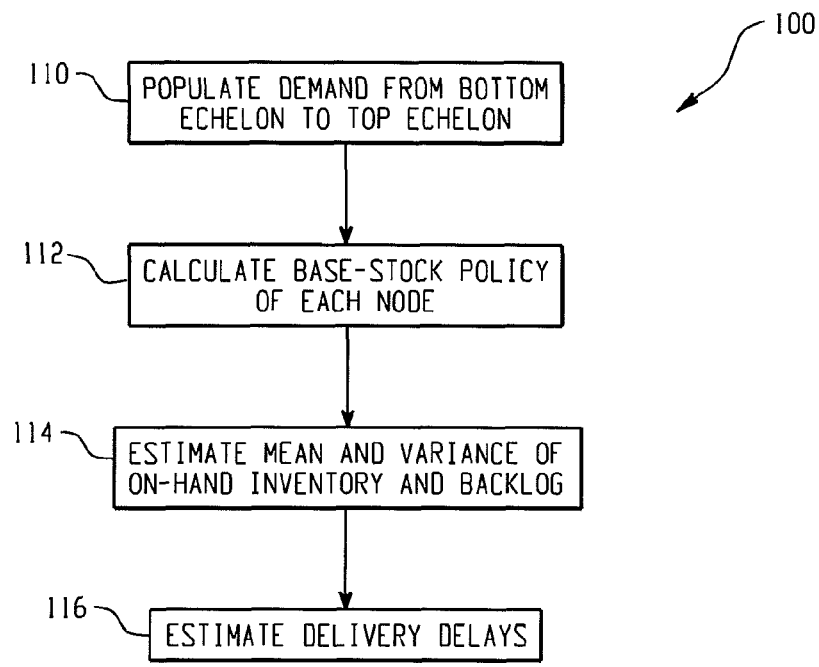
FIG. 6 is a flow diagram of an example method for estimating the upstream delays at locations in a multi-echelon inventory network.

FIG. 6 is a flow diagram of an example method 100 for estimating the upstream delays at locations in a multi-echelon inventory network. In step 110, the demand at each location is determined from the bottom echelon to the top echelon. An example method of determining the demand is described below with reference to FIG. 7. Then, at step 112, the base-stock policy is calculated for each node in the multi-echelon network. The base-stock policy may, for example, be calculated as follows:

(1) If SLtype=ReadyRate, find a minimum integer St that satisfies:

$$\text{prob}(Zt \leq St) \geq \alpha;$$

(2) Else if SLtype=FillRate, find a minimum integer St that satisfies the following expressions:

$$D = \frac{1}{T} \sum_t Dt;$$

$$\beta \leq 1 - \frac{E(Zt - St)^+}{E(D)};$$

(3) Else, find a minimum integer St that satisfies the following expressions:

$$D = \frac{1}{T} \sum_t Dt;$$

$$\gamma \leq \frac{E(Zt - St)^+}{E(D)};$$

WHERE,
Dt is the demand populated or demand forecast from step 110;
Zt is the projected demand over leadtime plus review interval periods;
α=ready rate
β=fill rate
γ=backorder ratio
SLtype=required service level type; and
St=order up-to level at period t.

With reference again to FIG. 6, the method then continues to step 114 to estimate the mean and variance of the on-hand inventory and backlog. For example, the mean and variance may be calculated as follows:

$$(X-a) = (X-a)^+ - (a-X)^+;$$

$$(X-a)^2 = [(X-a)^+]^2 + [(a-X)^+]^2;$$

WHERE,
$(X-a)^+$ corresponds to the backlog; and
$(a-X)^+$ corresponds to the on-hand inventory.

The delivery delays may then be calculated at step 116, for example using the following algorithms:

$$\gamma = \frac{E(B)}{E(D)};$$

$$CV_d^2 = \frac{\text{Var}(D)}{E(D)};$$

$$CV_b^2 = \frac{\text{Var}(B)}{E^2(D)};$$

$$E(\Delta L) = \gamma; \text{ and}$$

$$\text{Var}(\Delta L) = (CV_b^2 \gamma - CV_d^2)\gamma,$$

WHERE,
D=random demand per period at a node;
B=backlog at a node; and
ΔL=delivery delay due to stockout at a node.

Figure 7:
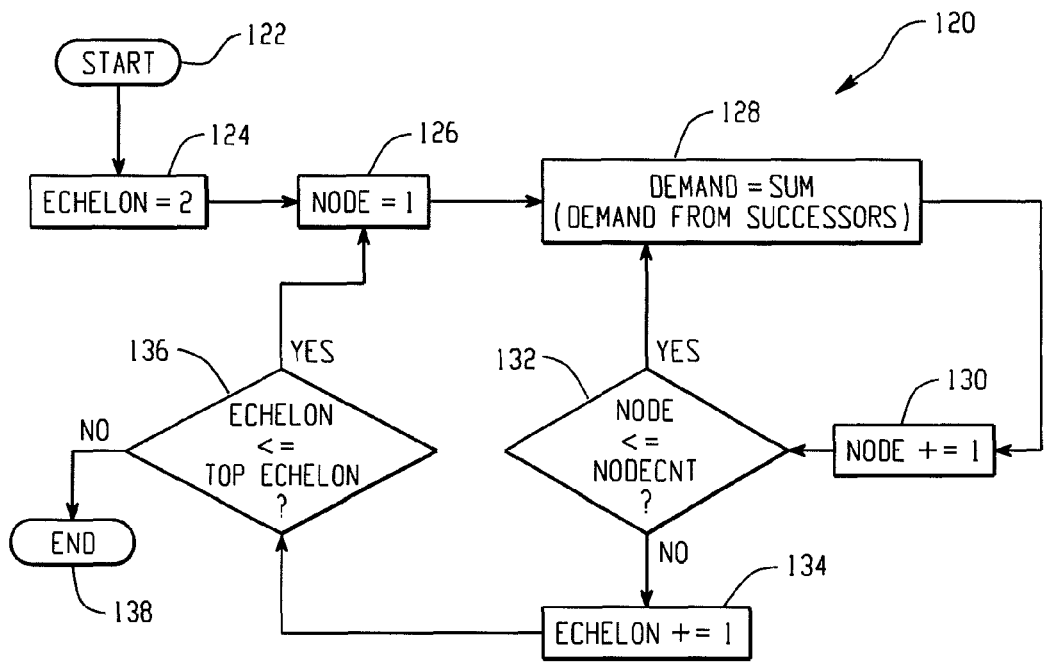
FIG. 7 is a flow diagram of an example method of determining the demand at locations in a multi-echelon inventory network.

With reference now to FIG. 7, an example method 120 for determining demand at each node is illustrated. The method begins at step 122. At step 124, the echelon level is initialized to 2 (because the demand forecast is known at echelon 1), and at step 126 the node is initialized to 1. Then, at step 128 the demand for the current node is determined as the sum of each of the successor nodes. That is, the demand of each upstream node is calculated as the sum of the demand of each immediate successor in the network. The node is then incremented at step 130 (e.g., node=node+1). At step 132, the method determines if all of the nodes in the current echelon have been considered. If not, then the method returns to step 128 to calculate to the demand for the next node (set at step 130). Otherwise, if demand has been determined for all of the nodes in the current echelon, then the method proceeds to step 134 where the echelon level is incremented (e.g., echelon=echelon+1).

At step 136, the method determines if all of the echelons have been considered. If not, then the method returns to step 126 to calculate demand for the nodes in the next echelon (set at step 134). Otherwise, if all of the echelons have been considered, then the method ends at step 138.

Figure 8:
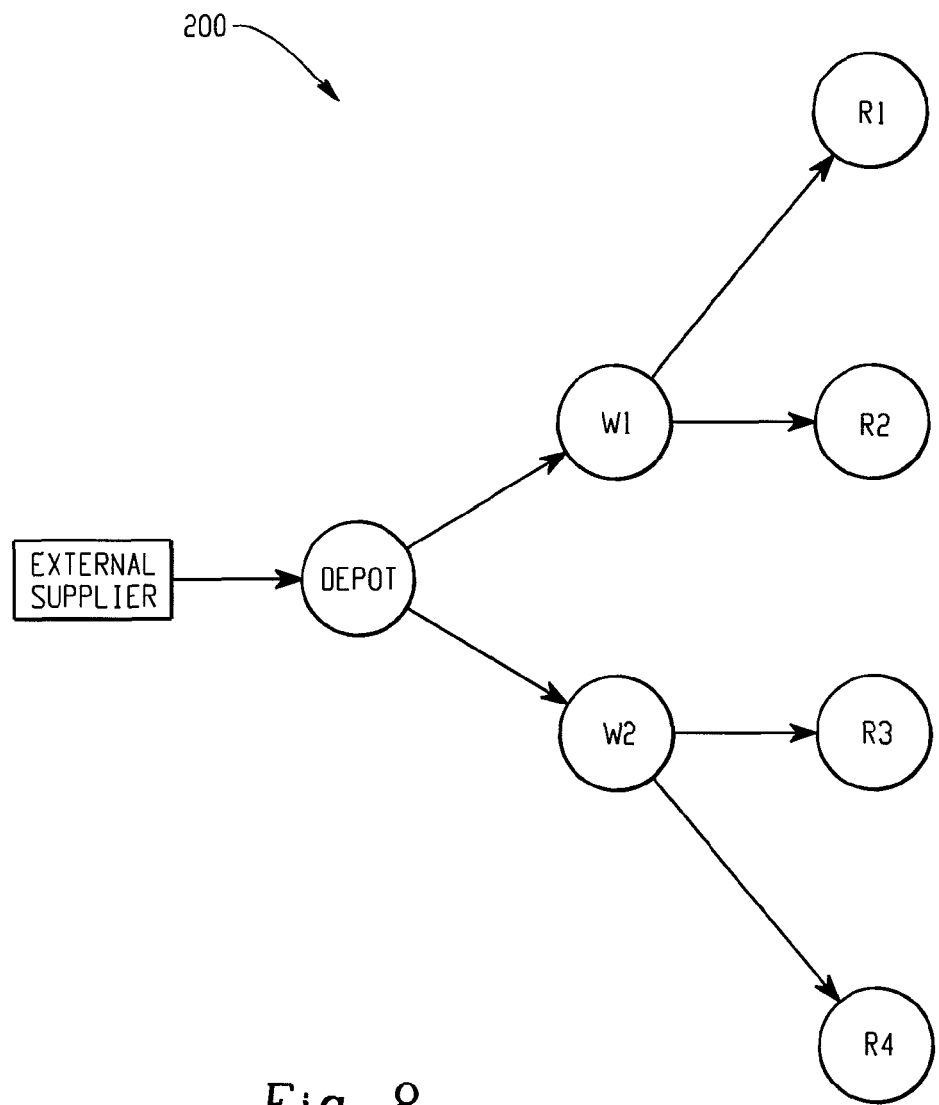

FIG. 8-20 provide an example to illustrate how an optimal multi-echelon inventory plan with lateral transshipment may be determined using the systems and methods described herein. FIG. 8 illustrates a multi-echelon inventory distribution network 200 that is used in this example. The example network 200 includes three echelons. The bottom echelon includes four retail locations (R1-R4), the middle echelon includes two warehouse locations (W1 and W2), and the top echelon includes a depot location. Primary supply channels are depicted in FIG. 8 by the solid arrows connecting the network nodes. As illustrated, retail locations R1 and R2 are primarily supplied by warehouse location W1 and retail locations R3 and R4 are primarily supplied by warehouse location W2. The warehouse locations W1 and W2 are both primarily supplied by the depot location.

FIGS. 9-11 depict examples of information that may be received in order to perform the optimization calculations. For instance, in the example system shown in FIG. 2, this information may be received by the central inventory optimization system 32 from a central database, from the inventory locations 34, from one or more other software applications (e.g., a forecasting software application), from user input, and/or from some other suitable information source. Specifically, FIG. 9 illustrates examples of the holding cost, order lead-time and required service level for each of the nodes in the example network. FIG. 10 illustrates examples of the demand forecast (forecast mean and forecast variance) over three future periods at each of the retail nodes (R1-R4). The forecasts may, for example, be determined based on historical data using a known forecasting software application. FIG. 11 illustrates examples of the planned inventory receipt at each location in the example network.

FIGS. 12 and 13 illustrate inventory pools for the example multi-echelon network 200. The inventory pools are defined in this example such that lateral transshipments may be made between any two locations within the same echelon. That is, lateral transshipments may be made between any two retail locations (R1-R4), as shown in FIG. 12, and also between the two warehouse locations (W1 and W2), as shown in FIG. 13. It should be understood that different inventory pools could be defined in other examples. For instance, in one alternative example, inventory pools could be defined to provide lateral transshipments between W1, R3 and R4 and between W2, R1 and R2.

In certain examples, the inventory pools may also define delivery modes. For instance, the inventory pool depicted in FIG. 12 may be defined to provide a same day delivery mode for lateral transshipment between retail locations R1-R4. In another example, the delivery mode for the inventory pool depicted in FIG. 13 may provide for a one week delivery lead-time for lateral transshipment between warehouse locations W1 and W2. As explained above, the lateral transshipment plan may be based on a tradeoff between inventory holding cost, transshipment cost and stock-out penalty cost subject to order constraints such as batch size and minimal order amount.

FIGS. 14-20 illustrate example results of the inventory optimization calculations. FIG. 14 illustrates an example of the estimated delivery delay mean and variance at each location in the example network 200. The estimated delivery delay may, for example, be determined using the method described above with reference step 72 of FIG. 5 and FIGS. 6 and 7. The delivery delay mean and variance at each location in the bottom echelon (R1-R4) are then taken into account to calculate an optimal inventory policy (inventory target) and optimal amount (optimal scheduled receipt) for each period in the protection interval (two periods in this example), as illustrated in FIG. 15. The optimal inventory policy and amount may, for example, be determined using the method described above with reference to step 76 of FIG. 5.

A simulation may then be run to estimate the average service level during the protection interval with the current on-hand and pipeline inventory, as illustrated in FIG. 16. The average and target service level may, for example, be calculated using the method described above with reference to step 78 of FIG. 5. From the table illustrated in FIG. 16, we see that retail locations R1 and R4 each have a projected service level that is higher than their target service level. Thus, for these two locations, R1 and R4, a calculation is made to determine the units (if any) of excess inventory that may be shared with other locations in the inventory pool. For instance, using the formula describe above with reference to step 80 of FIG. 5, the excess inventory at retail location R1 is equal to a minimum of (26−6, 26−6+0−9, 26−15)=11, where 15 is the inventory target for R1. A similar calculation shows that location R4 does not have any excess inventory to share. In addition, from the table shown in FIG. 16 we also see that retail locations R2 and R3 each have average service levels lower than their targets, and thus have a potential inventory shortage. For these two locations, R2 and R3, the potential inventory shortage may be calculated over the two periods of the protection interval. For instance, using the formula described above with reference to step 80 of FIG. 5, the total inventory deficit for R3 is a minimum (5−15, 5−15+6−18)=−22 units.

Having determined the inventory excesses and shortages, the optimal transshipment plan may be determined, for example as described above with reference to step 82 of FIG. 5. In the instant example, the optimal transshipment plan may provide for 5 units moving from R1 to R2 and 6 units moving from R1 to R4.

The optimal transshipment plan may then be used to update the planned inventory receipts for each network node, as illustrated in FIG. 17. This example assumes a zero delivery lead-time. For example, a simulation analysis may be used to determine the order quantity of each location in the bottom echelon. The demand streams from the simulation may then serve as the downstream demand to calculate the optimal inventory policy and transshipment for the next echelon.

The above steps may then be repeated to determine the optimal transshipment plan for the middle echelon (W1 and W2), as shown in FIGS. 18 and 19. An example of the optimal amount and inventory target, after obtaining random order samples from the bottom echelon in the performance simulator, is illustrated in FIG. 18. A simulation analysis may then be performed, as described above, to estimate the projected service level for W1 and W2 in the next three periods. The results of the simulation in this example show that W1 has an average projected service level that is higher than its target service level, and that W1 has 126 units of inventory to share. W2 has an average projected service level that is lower than its target, and has an inventory shortage of 63 units. As a result, the optimal transshipment plan in this example provides for moving 63 units from W1 to W2. Accounting for the lateral transshipment from W1 to W2, the updated inventory receipt for the middle echelon is illustrated in FIG. 19.

Using the updated inventory receipt shown in FIG. 19, another optimization analysis may be performed for this example to determine that W2 will order 3 units from the depot location. More specifically, the order stream from the middle echelon (W1 and W2) may then be used in a simulation analysis to calculate the optimal inventory policy and transshipment for the top echelon (Depot). However, as there is only one location in the top echelon, no transshipment activity is necessary, and only inventory optimization is necessary. For instance, in order to determine the optimal inventory policy at the Depot, the random order stream may be obtained in nodes W1 and W2 from the last round of the simulation. Then, the order steam may be fed into the simulator to calculate the optimal policy at the Depot (accounting for any delay at the Depot). The resultant inventory target and optimal amount for the top echelon (depot) over the protection interval is illustrated in FIG. 20.

FIGS. 21A and B are an example of an optimized inventory replenishment and transshipment plan 250 that may be generated using the systems and methods described herein. The illustrated example is an optimized inventory plan for a single location (Facility 15) in a multi-echelon inventory supply network. It should be understood that the illustrated inventory plan is provided as an example, but that other configurations and formats are also possible. For instance, an inventory replenishment and transshipment plan may be generated that covers multiple locations in a supply network and that includes more or less information than the illustrated example.

The illustrated inventory plan 250 presents the inventory location (e.g., the buyer) with suggested optimal orders, projected delivery, projected service level, and other inventory replenishment information. The example plan 250 includes a primary source orders field 252 that displays the suggested order from the primary supplier and an alternative source order field 254 that displays the suggested order from an alternative source (i.e., transshipment orders). Also included are a planned order receipts field 256 that displays inventory data projections for the current period and for a number of periods into the future and a replenishment plan metrics field 258 that displays order information, such as the projected service level, the order amounts and the projected costs.

Figure 22:
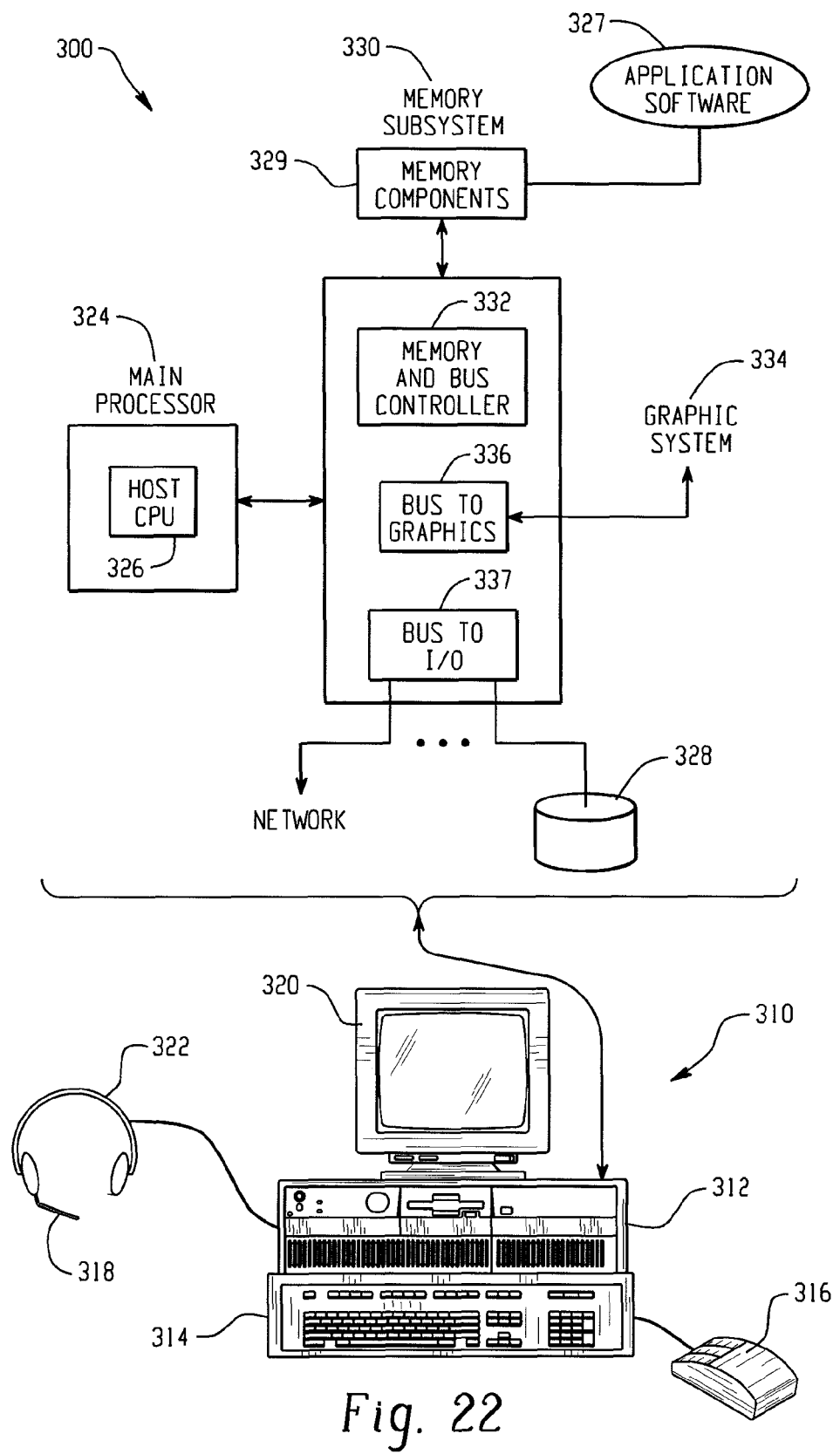
FIG. 22 illustrates exemplary hardware on which various embodiments of the systems and methods described herein may be practiced

FIG. 22 illustrates exemplary hardware 310 on which various embodiments of the systems and methods described herein may be practiced. The hardware 310 may be a personal computer system comprised of a computer 312 having as input devices keyboard 314, mouse 316, and microphone 318. Output devices such as a monitor 320 and speakers 322 may also be provided. The reader will recognize that other types of input and output devices may be provided and that the present invention is not limited by the particular hardware configuration.

Residing within computer 312 is a main processor 324 which is comprised of a host central processing unit 326 (CPU). Software applications 327, such as the method of the present invention, may be loaded from, for example, disk 328 (or other device), into main memory 329 from which the software application 327 may be run on the host CPU 326. The main processor 324 operates in conjunction with a memory subsystem 330. The memory subsystem 330 is comprised of the main memory 329, which may be comprised of a number of memory components, and a memory and bus controller 332 which operates to control access to the main memory 329. The main memory 329 and controller 332 may be in communication with a graphics system 334 through a bus 336. Other buses may exist, such as a PCI bus 337, which interfaces to I/O devices or storage devices, such as disk 328 or a CDROM, or to provide network access.

This written description uses examples to disclose the invention, including the best mode, and also to enable a person skilled in the art to make and use the invention. The patentable scope of the invention may include other examples that occur to those skilled in the art.

It is further noted that the systems and methods described herein may be implemented on various types of computer architectures, such as for example on a single general purpose computer or workstation, or on a networked system, or in a client-server configuration, or in an application service provider configuration.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It is claimed:

1. A method of optimizing inventory among a plurality of inventory locations, comprising:

receiving data associated with a hierarchy comprising a plurality of hierarchically-arranged nodes organized into parent-child relationships, wherein the nodes represent inventory locations, wherein the hierarchy includes a plurality of echelon levels, wherein a parent node is at a higher echelon level than child nodes, and wherein a parent node is a primary inventory supplier for a plurality of child nodes;

receiving an identification of an inventory pool that includes particular child nodes of a particular parent node in the hierarchy, wherein the particular child nodes are located in a same echelon level or at different echelon levels that are indirectly related;

receiving cost data, wherein the cost data includes a cost associated with an under-supply of inventory at a child node, a cost associated with an excess inventory at a child node, and a cost associated with transporting inventory among the particular child nodes in the inventory pool;

determining, using one or more data processors, an optimal inventory amount at the particular child inventory location nodes;

determining, using the one or more data processors, an estimated service amount at the particular child inventory location nodes based on the optimal inventory amounts, wherein inventory location nodes having a surplus service amount are surplus inventory location nodes, and wherein inventory location nodes having a shortage service amount are shortage inventory location nodes;

optimizing, using the one or more data processors, a transshipment plan for the inventory location nodes in the inventory pool, wherein optimizing is based on the surplus inventory location nodes, the shortage inventory location nodes, the cost associated with the under-supply of inventory, the cost associated with excess inventory, and the cost associated with transporting inventory, and wherein the optimizing involves minimizing a cost associated with the inventory pool;

determining, using the one or more data processors, a revised estimated service amount for the particular child inventory location nodes based on the transshipment plan;

determining, using the one or more data processors, an optimal inventory amount at a particular parent inventory location node based on the revised estimated service amounts;

determining, using the one or more data processors, an estimated service amount at the particular parent inventory location node based upon the optimal inventory amount for the particular parent inventory location node; and optimizing, using the one or more data processors, an additional transshipment plan for a plurality of additional inventory location nodes that include the particular parent inventory location node based on the estimated service amount at the particular parent inventory location node.

2. The method of claim 1, wherein the inventory originates at a primary supply location, and wherein a node representing the primary supply location is not included in the inventory pool.

3. The method of claim 1, further comprising determining the optimal inventory amounts based on demand forecasts, expected delivery delays, inventory review internal, ready rate, or fill rate.

4. The method of claim 1, further comprising determining the revised estimated service amounts based on the transshipment plan and an inventory replenishment plan that provides inventory from a primary supply location.

5. The method of claim 1, wherein determining the estimated service amount further comprises determining an average inventory level for a particular node.

6. The method of claim 1, wherein the inventory pool includes two or more inventory location node in a particular echelon level, and at least one inventory location node in another echelon level.

7. The method of claim 1, wherein inventory is shipped among the inventory location nodes according to the transshipment plan and the additional transshipment plan, wherein the inventory is shipped directly between inventory locations nodes that are at a same echelon level or inventory location nodes that are at different echelon levels that are indirectly related.

8. A computer-implemented system for optimizing inventory among a plurality of inventory locations, comprising:
one or more data processors;
one or more computer-readable storage mediums containing instructions configured to cause the one or more processors to perform operations including:
receiving data associated with a hierarchy comprising a plurality of hierarchically-arranged nodes organized into parent-child relationships, wherein the nodes represent inventory locations, wherein the hierarchy includes a plurality of echelon levels, wherein a parent node is at a higher echelon level than child nodes, and wherein a parent node is a primary inventory supplier for a plurality of child nodes;
receiving an identification of an inventory pool that includes particular child nodes of a particular parent node in the hierarchy, wherein the particular child nodes are located in a same echelon level or at different echelon levels that are indirectly related;
receiving cost data, wherein the cost data includes a cost associated with an under-supply of inventory at a child node, a cost associated with an excess inventory at a child node, and a cost associated with transporting inventory among the particular child nodes in the inventory pool;
determining an optimal inventory amount at the particular child inventory location nodes;
determining an estimated service amount at the particular child inventory location nodes based on the optimal inventory amounts, wherein inventory location nodes having a surplus service amount are surplus inventory location nodes, and wherein inventory location nodes having a shortage service amount are shortage inventory location nodes;
optimizing a transshipment plan for the inventory location nodes in the inventory pool, wherein optimizing is based on the surplus inventory location nodes, the shortage inventory location nodes, the cost associated with the under-supply of inventory, the cost associated with excess inventory, and the cost associated with transporting inventory, and wherein the optimizing involves minimizing a cost associated with the inventory pool;
determining a revised estimated service amount for the particular child inventory location nodes based on the transshipment plan;
determining an optimal inventory amount at a particular parent inventory location node based on the revised estimated service amounts;
determining an estimated service amount at the particular parent inventory location node based upon the optimal inventory amount for the particular parent inventory location node; and
optimizing an additional transshipment plan for a plurality of additional inventory location nodes that include the particular parent inventory location node based on the estimated service amount at the particular parent inventory location node.

9. The system of claim 8, wherein the inventory originates at a primary supply location, and wherein a node representing the primary supply location is not included in the inventory pool.

10. The system of claim 8, wherein the system is configured to determine the optimal inventory amounts based on demand forecasts, expected delivery delays, inventory review internal, ready rate, or fill rate.

11. The system of claim 8, wherein the system is configured to determine the revised estimated service amounts based on the transshipment plan and an inventory replenishment plan that provides inventory from a primary supply location.

12. The system of claim 8, wherein the system is configured to determine the estimated service amount at a particular node via determining an average inventory level at the particular node.

13. The system of claim 8, wherein the inventory pool includes two or more inventory location nodes in a particular echelon level and at least one inventory location node in another echelon level.

14. The system of claim 8, wherein inventory is shipped among the inventory location nodes according to the transshipment plan and the additional transshipment plan, wherein the inventory is shipped directly between inventory locations nodes that are at a same echelon level or inventory location nodes that are at different echelon levels that are indirectly related.

15. A non-transitory computer-program product for optimizing inventory among a plurality of inventory locations, tangibly embodied in a machine-readable non-transitory storage medium, including instructions configured to cause a data processing apparatus to:

receive data associated with a hierarchy comprising a plurality of hierarchically-arranged nodes organized into parent-child relationships, wherein the nodes represent inventory locations, wherein the hierarchy includes a plurality of echelon levels, wherein a parent node is at a higher echelon level than child nodes, and wherein a parent node is a primary inventory supplier for a plurality of child nodes;

receive an identification of an inventory pool that includes particular child nodes of a particular parent node in the hierarchy, wherein the particular child nodes are located in a same echelon level or at different echelon levels that are indirectly related;

receive cost data, wherein the cost data includes a cost associated with an under-supply of inventory at a child node, a cost associated with an excess inventory at a child node, and a cost associated with transporting inventory among the particular child nodes in the inventory pool;

determine an optimal inventory amount at the particular child inventory location nodes;

determine an estimated service amount at the particular child inventory location nodes based on the optimal inventory amounts, wherein inventory location nodes having a surplus service amount are surplus inventory location nodes, and wherein inventory location nodes having a shortage service amount are shortage inventory location nodes;

optimize a transshipment plan for the inventory location nodes in the inventory pool, wherein optimizing is based on the surplus inventory location nodes, the shortage inventory location nodes, the cost associated with the under-supply of inventory, the cost associated with excess inventory, and the cost associated with transporting inventory, and wherein the optimizing involves minimizing a cost associated with the inventory pool;

determine a revised estimated service amount for the particular child inventory location nodes based on the transshipment plan;

determine an optimal inventory amount at a particular parent inventory location node based on the revised estimated service amounts;

determine an estimated service amount at the particular parent inventory location node based upon the optimal inventory amount for the particular parent inventory location node; and optimize an additional transshipment plan for a plurality of additional inventory location nodes that include the particular parent inventory location node based on the estimated service amount at the particular parent inventory location node.

\* \* \* \* \*